US006360876B1

(12) United States Patent
Nohl et al.

(10) Patent No.: US 6,360,876 B1
(45) Date of Patent: *Mar. 26, 2002

(54) PORTABLE TELESCOPING RADIAL STACKING CONVEYOR

(75) Inventors: Jerry D. Nohl; Bob L. Domnick; Rick D. Kellenberger; Paul Schmidgall, all of Morris, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/175,910

(22) Filed: Oct. 20, 1998

Related U.S. Application Data

(63) Continuation-in-part of application No. 08/649,895, filed on May 14, 1996, now Pat. No. 5,833,043, which is a continuation-in-part of application No. 08/288,995, filed on Aug. 11, 1994, now Pat. No. 5,515,961.

(51) Int. Cl.$^7$ .................... B65G 15/26; B65G 17/28; B65G 21/10; B65G 21/14; B65G 37/00
(52) U.S. Cl. .................... 198/588; 198/812; 198/861.1; 198/302; 198/306
(58) Field of Search ............... 198/588, 812, 198/861.1, 302, 306

(56) References Cited

U.S. PATENT DOCUMENTS

| | | | |
|---|---|---|---|
| 2,263,506 A | * 11/1941 | Lane | |
| 2,309,715 A | * 2/1943 | Rudow | |
| 3,552,546 A | * 1/1971 | Rath | |
| 3,563,364 A | * 2/1971 | Arndt | |
| 3,722,477 A | * 3/1973 | Weldy et al. | 119/846 |
| 3,874,136 A | * 4/1975 | Michel | 52/115 |
| 4,101,019 A | * 7/1978 | Satterwhite | 198/300 |
| 4,135,614 A | * 1/1979 | Pentermann et al. | 198/306 |
| 4,171,040 A | * 10/1979 | Nickol | 198/302 |
| 4,172,518 A | 10/1979 | Grayson | 198/631 |

(List continued on next page.)

OTHER PUBLICATIONS

The Superior TeleStacker 150: One Sheet promotional description of the commerical embodiment of the telescoping portable radial stacking conveyor according to the instant application.
Crushboss portable radial stacking conveyor promotional sheet: One page.
Greystone conveyor systems promotional brochure: Five pages.
Screen Machine portable radial stacking conveyor promotional brochure: One page.
Thor Aggregate Equipment Co. telescoping portable radial stacking conveyor promotional brochure: Two pages.
Vince Hagen Company portable radial stacking conveyor promotional brochure: Three pages.

*Primary Examiner*—Robert P. Olszewski
*Assistant Examiner*—Richard Ridley
(74) *Attorney, Agent, or Firm*—Larry M. Jennings

(57) ABSTRACT

A portable telescoping radial stacking conveyor for stacking bulk material such as aggregate, sand, coal, wood chips, grain, and similar materials has a fully extended length of 150 feet and a towing length of 80 feet or less. The unit may be converted from a highway transportable configuration to an operating configuration by one individual in approximately twenty minutes. Hydraulically operated radial drive wheels, elevating struts and stinger positioner can be manually controlled or controlled with a programmable logic controller (PLC) to position the discharge point at the desired location at the desired time. Segregation of stacked material according to particle size can be controlled by appropriately relocating the conveyor discharge point at frequent intervals so that the material is deposited in small piles that form layers of stockpiled material instead of the usual single large stockpile.

9 Claims, 15 Drawing Sheets

U.S. PATENT DOCUMENTS

| | | | |
|---|---|---|---|
| 4,236,630 A | 12/1980 | Sander et al. | 198/577 |
| 4,245,732 A | 1/1981 | Couperus | 198/313 |
| 4,427,104 A | 1/1984 | Reid, Jr. | 198/306 |
| 4,474,287 A | 10/1984 | Thompson | 198/812 |
| 4,523,669 A | 6/1985 | Smith | 198/313 |
| 4,624,357 A | 11/1986 | Oury et al. | 198/313 |
| 4,643,299 A | 2/1987 | Calundon | 198/812 |
| 4,744,459 A | 5/1988 | Ryan | 198/508 |
| 5,203,442 A * | 4/1993 | Oury et al. | 198/313 |
| 5,390,777 A | 2/1995 | Gage | 198/306 |
| 5,499,899 A | 3/1996 | Hibbs | 414/786 |
| 6,056,252 A | 5/2000 | Johannsen | 248/188.3 |

* cited by examiner

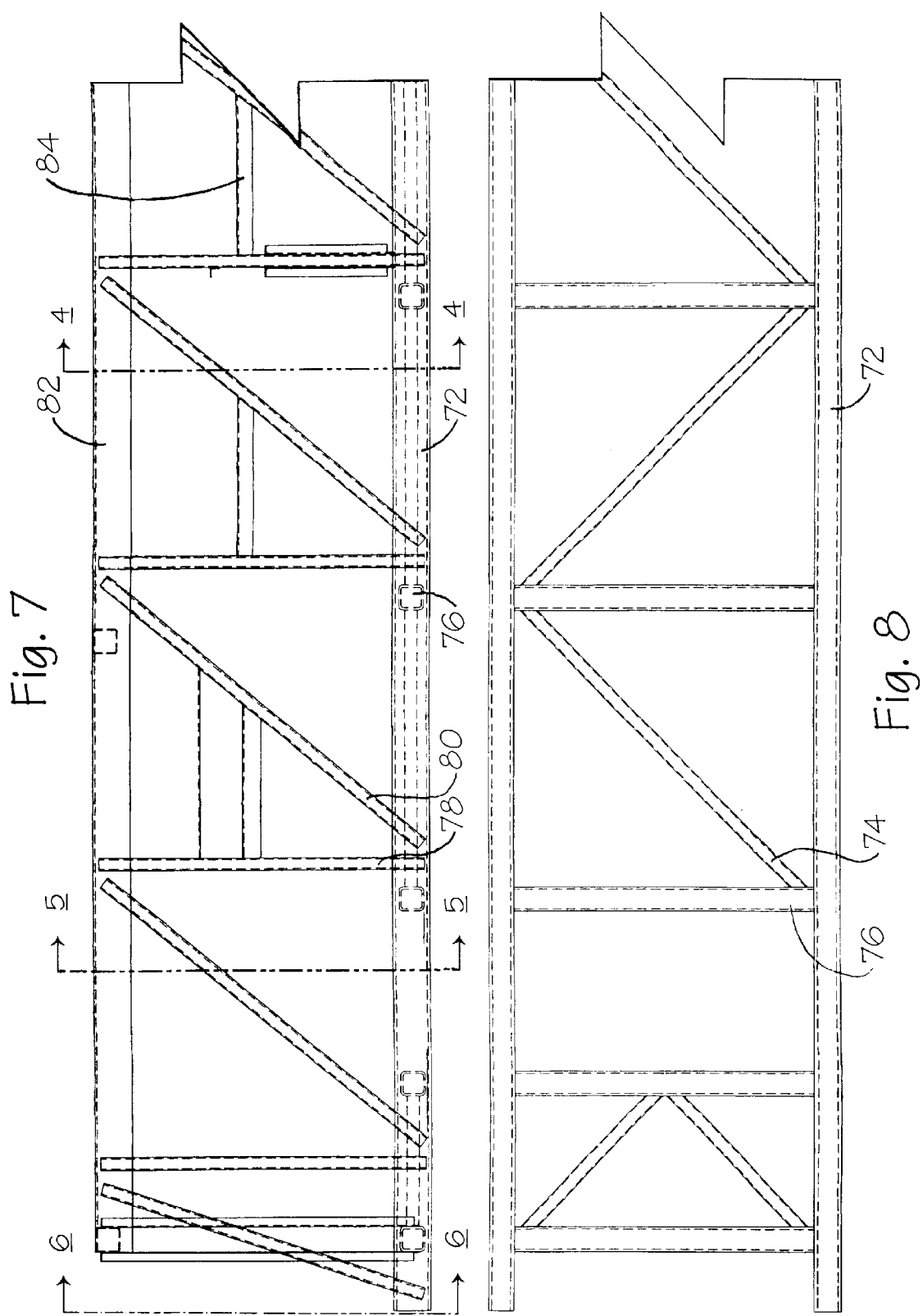

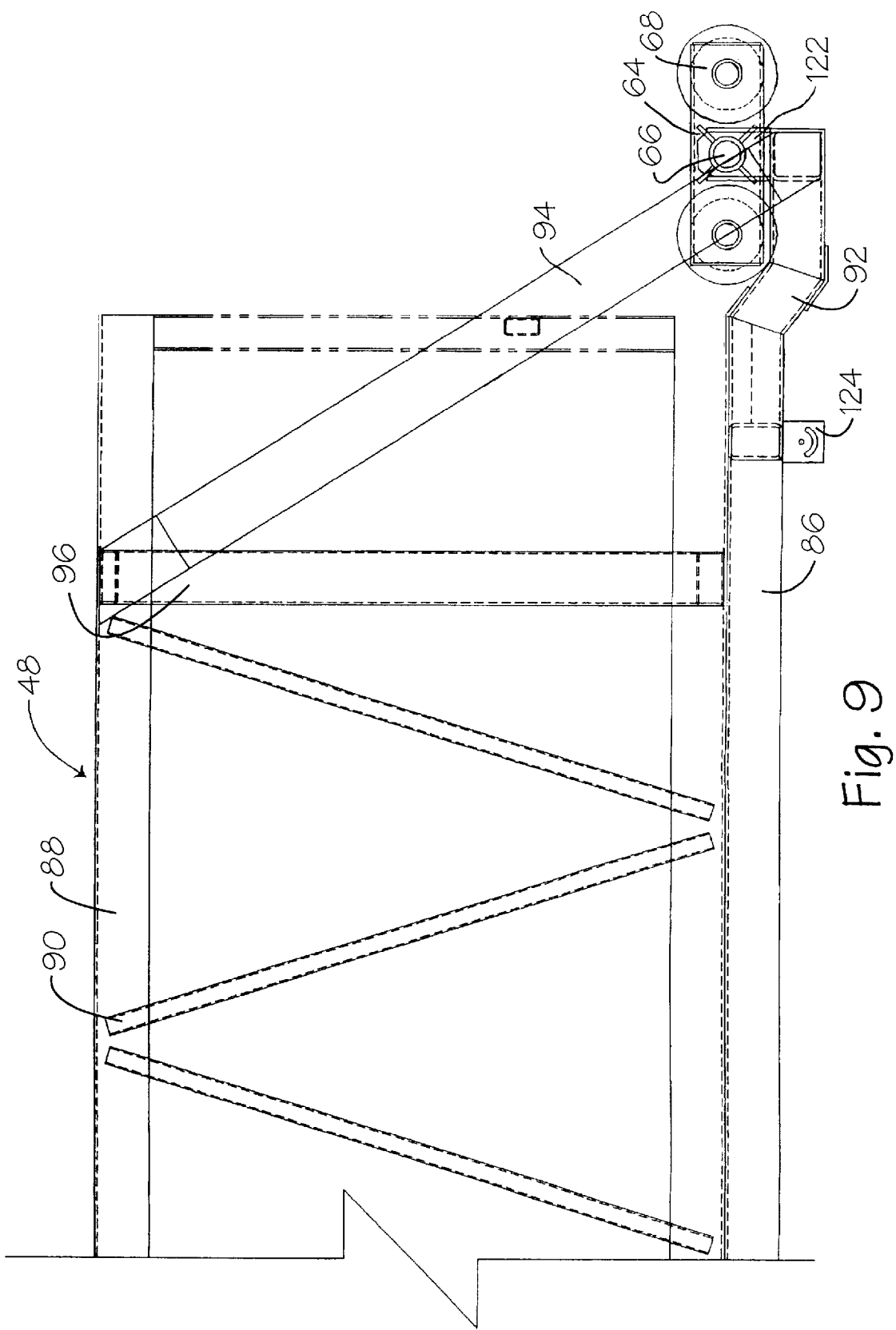

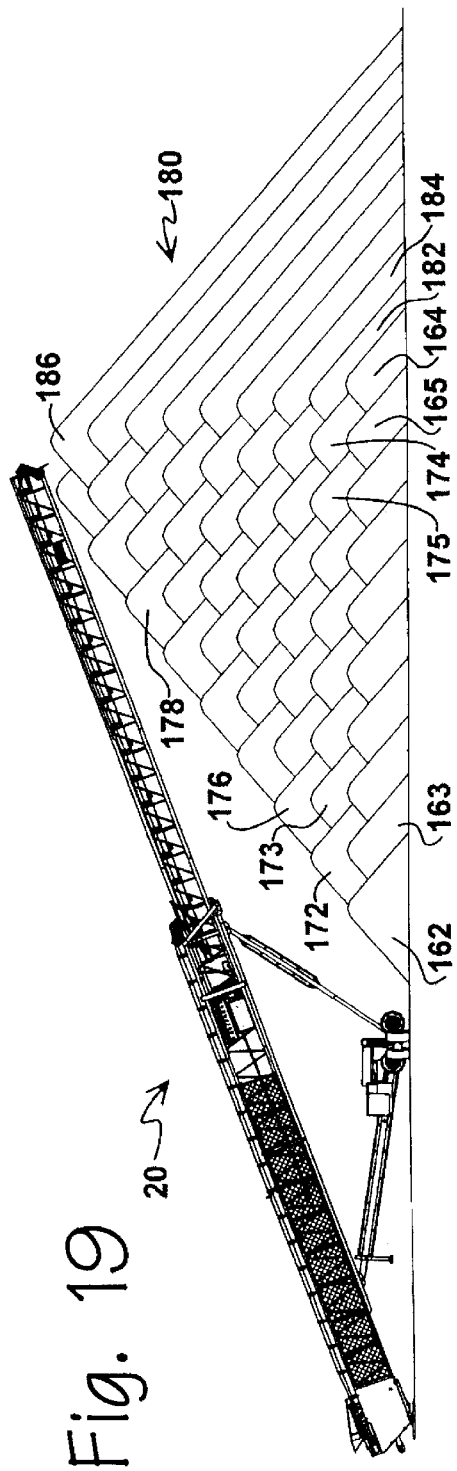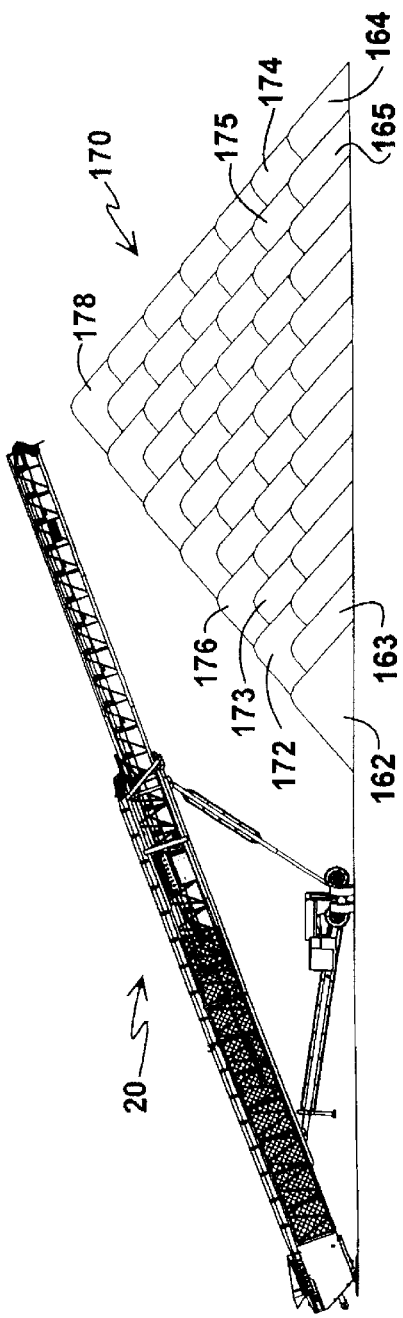
Fig. 19
Fig. 18

PORTABLE TELESCOPING RADIAL STACKING CONVEYOR

CROSS-REFERENCE TO RELATED APPLICATIONS

This application is a continuation-in-part of U.S. patent application Ser. No. 08/649,895, filed May 14, 1996, now U.S. Pat. No. 5,833,043 issued Nov. 10, 1998, which was a continuation-in-part of U.S. patent application Ser. No. 08/288,995 filed Aug. 11, 1994, now U.S. Pat. No. 5,515,961, issued May 14, 1996.

STATEMENT REGARDING FEDERALLY SPONSORED RESEARCH OR DEVELOPMENT

Not Applicable

BACKGROUND OF THE INVENTION

1. Field of the Invention

The present disclosure is related generally to bulk product conveying machinery and methods including means to permit movement of a conveyor to different working positions or orientations relative to the carrier on which it is mounted. More particularly, the apparatus is related to portable aggregate handling conveyors wherein the conveyor can be telescoped to a more compact configuration than it has when operating to facilitate transporting the conveyor along a highway. In greater particularity, the invention is related to an apparatus including separate conveyors mounted on a single carrier so that they successively convey a load to multiple discharge points to effect the formation of larger stockpiles than is otherwise possible and to reduce the segregation of stored material by size during the stacking process.

In particular, the apparatus according to this specification is related to an endless belt-type conveyor having means for telescopically varying its conveying length either manually or automatically.

2. Description of Related Art

Radial stacking conveyors are known in the art. For example, U.S. Pat. No. 5,515,961 to Murphy and Schmidgall discloses a portable radial stacking conveyor that may be easily folded from its fully extended length of approximately 38.1 m (125 feet) to a transport configuration of slightly more than half the fully extended length. Radial stacking of bulk materials such as aggregate for road construction, grain, or coal enables substantially more material to be stored in a stack than is possible using a conventional, conical stack.

A telescoping, variable length conveyor assembly is disclosed by Thompson in U.S. Pat. No. 4,474,287 issued Oct. 2, 1984, for a variable length conveyor assembly. Thompson's conveyor is intended for use in coal mines to remove coal from a continuous mining machine. Another telescoping mining tool is disclosed in U.S. Pat. No. 4,236,630 issued Dec. 2, 1980 to Sander, et al. for an extensible telescopic coal bunker for subsurface mining. Neither unit is adapted for radial stacking. A similar telescopic belt conveyor is shown in U.S. Pat. No. 4,643,299 issued Feb. 17, 1987, to Calundan for a conveyor that uses a complex serpentine belt path to keep the single belt at the correct tension, regardless of the degree of extension of the discharge end from the feed end.

Another approach is shown by Smith in U.S. Pat. No. 4,523,669 issued Jun. 18, 1985, for a retractable conveyor belt that can include an optional articulated conveyor element on the discharge end of the main, vehicle-mounted conveyor. U.S. Pat. No. 4,624,357 issued Nov. 25, 1986 to Oury et al. for a vehicle-mounted extensible conveyor also describes a portable conveyor that can be extended and retracted in addition to being pivoted both vertically and laterally to discharge material at the desired point. Both of these vehicle-mounted conveyor assemblies are intended for transporting wet concrete from the mixer truck to the pour location. Neither is suited for stacking large piles of aggregate that are needed in the road construction industry.

Several other radial stacking conveyors have been developed by earlier workers in the field. Among those patented are: U.S. Pat. No. 5,390,777 issued Feb. 21, 1995, to Gage for a constant pivot mechanism for variable height radial stacking conveyors; U.S. Pat. No. 4,427,104 issued Jan. 24, 1984 to Reid, Jr. for a radial stacker, and; U.S. Pat. No. 4,245,732 issued Jan. 20, 1981 to Couperus for a compactly foldable radial luffing stacker. None of the radial stackers shown by Gage, Reid, and Couperus disclose extending, telescoping or other means for varying the radius at which material is deposited.

A method and apparatus for accumulating stockpiles of flowable solid material is disclosed by Ryan in U.S. Pat. No. 4,744,459 issued Mar. 17, 1988. Ryan's method includes depositing the material in staggered piles to achieve satisfactory intermixing of the stockpiled materials. The apparatus is intended, however, for use inside buildings and appears to be neither portable nor easily re-locatable.

None of the radial stackers known in the art provide either the maximum storage capacity or the maximum efficiency that could be obtained from a portable radial stacking conveyor. By way of example, a portable telescopic radial stacker that is manufactured by Thor Aggregate Equipment of 839 Westport Crescent, Mississauga, Ontario, L5T 1E7, Canada has a full extension length of about 136 ft. Thor states that its telescopic stacker will stockpile 154% of the material that could be placed using a conventional radial stacker of the same length. The extra material is stacked radially closer to the center, or pivot point, of the arc described by the discharge end of the radial stacking conveyor as it places material for storage.

An article in the July/August, 1998 *Aggregates and Roadbuilding Contractor* magazine by Stephen R. Carr identified several limitations inherent in conventional means for radial stacking that may be overcome with telescoping radial stackers. When materials having a distribution of particle sizes are delivered to a stockpile, the particles tend to segregate according to size. Larger particles tend to roll to the bottom of a stack. A conical stack made with evenly mixed material will tend to form with smaller particles being concentrated in the center and top of the stack and larger particles at the bottom and outside of the stack. Those tendencies increase with increasing stack height. The same forces apply to a radial stack with larger particles concentrating at the outer bottom edge of the stockpile. In some instances it is necessary to re-build a stockpile by re-distributing the material with loaders and bulldozers.

When used properly, the telescoping radial stacker will stockpile product without segregating the screened material according to size and deviate from specification. The even distribution of the particles is maintained by stockpiling the material in layers of small stacks instead of one large stack. Not only does the telescoping action minimize size segregation, it also enables the operator to store a substantially larger amount of material in a stockpile of any given radius by filling part of the interior of the stacker arc with material.

In evaluating whether to purchase a conventional stacker, a radial stacker, or a telescopic radial stacker, the costs that must be paid as the result of operating each model should be the considered. Consequences of stockpile size segregation can add considerably to the cost of operating either a radial stacker, which is less expensive than a telescopic radial stacker, or a relatively inexpensive fixed stacker.

An operator supplying aggregate may be required to pay a penalty for delivering non-conforming product. To avoid such penalties, it may be necessary to operate bulldozers, scrapers, dump trucks, loaders, and other machinery for extended periods to reform a segregated stockpile; not only is such machinery expensive to operate, it also compacts, and reduces the value of, the product. A loader may use more operator time, 15 or 20% more fuel, and extra machine wear and tear loading out a compacted aggregate pile compared to a stockpile created by a conveyor.

Other costs of re-blending product can include the reduced availability of machines for revenue-producing tasks, the value of foregone opportunity, and the necessity of purchasing, maintaining, depreciating, and financing additional equipment to replace the equipment engaged in stockpile re-work. The additional work entailed to re-blend aggregate will also increase labor costs. Even if the degree of segregation is not so severe that it must be re-built, more time and more skill will be required if the loader operator must take material from different locations of the pile in order to create, in each truckload, a batch of aggregate that conforms to the applicable specifications.

Not only is it important to be able to control the location of the conveyor discharge, aggregate stacking machinery must frequently be portable so that the owner of the equipment may relocate to the vicinity of the road improvements that are undertaken. Although many road construction contractors have a statewide or regional area in which most or all of their work is done, it can still be necessary to relocate from one site to another site that is several hundred miles away. In other instances, it is necessary to relocate the field operations of a road construction enterprise fairly frequently, perhaps monthly or even more often. In either circumstance, preferred characteristics of portable aggregate handling equipment generally, and of portable telescoping radial stacking conveyors specifically, include:

The equipment can be towed from one job site to the next over state and federal highways in compliance with routinely granted oversize load permits.

The equipment converts from the transport configuration to the working configuration both quickly and easily.

The transport configuration provides dual-wheeled tandem axles so that transport permits may be obtained in most or all states.

The radial stacking configuration has adequately spaced-apart travel wheels to maximize stability.

The equipment produces that maximum extension length that is practical in a portable stacking conveyor.

None of the known telescoping radial stacking conveyors adequately incorporates all of the desirable features identified above. In addition, no prior art portable telescopic radial stacker is known to have an overall operating length of more than 41.5 m (136 feet). Increasing conveyor length by only 4.3 m (14 feet) yields a conveyor that is 45.7 m (150 feet) long that makes a stockpile that holds over 30% more material. In other words, a telescoping radial stacker that has a length of 45.7 m (150 feet) can both prevent aggregate segregation problems and also create a stockpile that holds approximately twice as much material as a stockpile made using a conventional (non-telescoping) radial stacker that is 41.5 m (136 feet) long.

The lengths to which the stinger extends and retracts are limited by several practical constraints.

Portability is an essential feature of radial stackers of this type, and the ease or difficulty with which a machine can be relocated is an important consideration for the owner of such machines. The maximum vehicle length permitted for transport over public roadways varies by jurisdiction. In practical terms, however, a towing length of less than 24.4 m (80 feet) is desirable in most jurisdictions, and the maximum height must not exceed 4.3 m (14 feet).

Another important consideration is the maximum extension length of the conveyor. Adding only a few meters (feet) to the working length of a conveyor will substantially increases the capacity of the stockpile that the conveyor can make. It can readily be appreciated that each additional meter of extension can add many tons to the total amount of material in the stockpile by increasing both the radius and the height of the stockpile. Filling more of the interior radius of the stockpile is of less benefit because the amount potential additional storage volume is much less due to the fact that the radius of the open area at the center of the stockpile cannot be less than the radius traveled by the stacker radial wheels.

The constraints mentioned above make it difficult to fabricate a portable telescoping radial stacking conveyor with an extension much greater than 45.7 m (150 feet). The requirement of transportability on public roads limits the height and the length of the primary conveyor framework, the exterior of the secondary framework must be smaller in length, width, and height than the interior of the primary. The secondary and primary frames must overlap. In the present embodiment, an overlap of about 12 feet is provided. An economically feasible way to reduce overlap substantially from about 12 feet does not appear forthcoming. Yet another constraint on the maximum conveyor extension is the necessity of supporting the conveyor by only the ground-contacting wheels and pivot. Extension of a stinger beyond the distance for which the entire system has been designed could cause the machine to tip or result in failure of the frame members or support struts.

These limitations persist regardless of the configuration of the primary or "main" and the retractable secondary, or "stinger" conveyors. The longest prior art telescoping portable radial stacker known is believed to have approximately the same transport length as an embodiment of the present disclosure but with a shorter operational length of 41.5 m (136 feet). That manufacturer states that the telescopic conveyor can stockpile 50% more material than a conventional (non-telescoping) conveyor of an equal fixed length (i.e. 41.5 m (136 feet)). The extra material is stacked radially closer to the center, or pivot point, of the arc described by the discharge end of the stacker that is 41.5 m (136 feet) in length and can pile approximately 340,200 kg (375 tons) per degree of arc. The structure disclosed is designed to provide a maximum extension of 45.7 m (150 feet) which makes it possible to stockpile 453,600 kg (500 tons) of aggregate per degree of arc. By practicing the present disclosure, it is possible to stockpile nearly 30% more material than can be handled by any other radial stacking conveyor presently known.

It should be emphasized that there are several advantages to be gained from increasing the storage capacity of a bulk product stockpile. A single machine set-up (or fewer set-ups in the case of very large projects) enhances production because more time is spent doing productive work and less time is spent in preparation. When the area required for storage is smaller, the cost of land is lower. With less area disturbed, there is less fugitive dust emitted and restoration of the land to prepare it for another purpose is effected more easily and at less expense.

What is needed, then, is a radial stacking conveyor that maximizes the amount of material that can be placed and that can be quickly relocated from one job site to another. The industry further needs a portable radial stacking conveyor that has a telescoping discharge and can be controlled to pile bulk materials such as aggregate in layers of small piles so that the material does not segregate based on particle size.

BRIEF SUMMARY OF THE INVENTION

The telescoping portable radial stacker according to the present disclosure overcomes some limitations and minimizes the impact of others. Portability is achieved by withdrawing the stinger into the main conveyor frame to reduce the towing length of 24.4 m (80 feet) while holding the maximum height to 4.2 m (13'-10").

This disclosure shows a telescoping portable radial stacking conveyor that may be converted from the transport configuration to the working configuration both quickly and easily. Product stockpiled with such an embodiment has less segregation than product stockpiled using conventional techniques. This apparatus is designed to maintain the quality of the stockpiled product so that material that meets specification when delivered to the stacker will also meet the specification when it is reclaimed from the stockpile. The enhanced efficiency of the present stacker compared to earlier attempts of others is gained by the ability to store more material in better condition than any other portable stacking system known. The proper storage technique can reduce re-work and make the ordinary activity of product loading much more easily accomplished.

The ability to form large stockpiles relatively quickly increases the efficiency of crushing plant operations. The present invention can be made with various belt widths. Configurations that use a 91 cm (36") belt width are frequently specified. Equipped with electric belt drive motors having adequate horsepower on both the primary and the secondary conveyors, the stacker can place about 907,200 kg (1,000 tons) of crushed rock aggregate per hour.

The telescoping radial stacker is comprised of a radial stacking conveyor to which is added an axially extensible, retractable stinger conveyor and a control system to enable the position of the stinger to be changed periodically (e.g. every minute or two). The control system can cause the stinger to reciprocate automatically or it may enable the operator to manually position the discharge point of the stinger.

The invention is an improved portable radial stacking conveyor that has a telescoping discharge portion. The telescoping discharge portion is a second, relatively smaller, belt conveyor, often referred to as the stinger. The stinger fits within the framework of the primary, or main, conveyor so that the upper belt surface of the stinger conveyor belt is below the return idler rolls of the primary conveyor. Material discharged from the primary belt lands on the stinger belt rather than falling directly onto the stockpile. Separate drive mechanisms are provided for the stinger conveyor belt and for the main conveyor belt. Each conveyor belt is driven by an electric motor and gear reducer assembly mounted at the discharge end that turns the shaft of the end roller which has nearly 180 degree contact with the inner side of the belt.

The stinger is mounted on rollers so that it can extend longitudinally from within the primary conveyor framework or be retracted into the primary conveyor. Main conveyor and stinger longitudinal axes are parallel, and the stinger is equipped with a positioner drive mechanism to extend and retract it axially with respect to the main conveyor structure. Extending or retracting the stinger changes the effective length of the conveyor and the location at which product will be deposited. Proper deposition of product greatly reduces segregation of large from small particles. In the present embodiment, the maximum extension is about 45.7 m (150 feet) which enables an operator to prepare a stockpile that is 15.2 m (50 feet) tall.

Automatic controls can be used to effect both axial movement of the stinger and radial movement of the main conveyor. Alternatively, the machine operator may set the discharge position manually.

The present stacking conveyor is made of two truss sections, a larger, outer steel framework into which the smaller, inner, moveable stinger truss section fits. The larger section, or outer framework, is mounted to an axle assembly that has at least one ground-contacting wheel and tire mounted on either side of the longitudinal axis of the outer frame. The axle assembly may also include radial movement wheels that may be the same as the road transport wheels, but are preferably different so that the appropriate flotation can be obtained and also so that the wheels can be quickly set-up using hydraulic or mechanical provisions to transfer the weight from the transport wheels to the radial motion wheels. Another important feature is that the preferred transport carriage includes road wheels that are carried on true tandem walking beam axles that, compared to conventional tandem axles, provide not only superior weight distribution on road surfaces, but also greatly enhanced ride performance and better flotation. Dual wheeled tandem axles make it easier to obtain transport permits that most states require when loads that are as wide and as heavy as the present invention travel over public roads. Some jurisdictions will not permit transport of a load the size and weight of a portable telescoping radial stacking conveyor unless the trailing vehicle is fitted with tandem axles.

An elevating mechanism, or telescoping undercarriage, is provided to control the material discharge height. A variety of elevating mechanisms may be used and may be mechanical or hydraulic. Although a single ram may be used to raise and lower the conveyor, a satisfactory configuration may use two hydraulic rams. On each (the left and the right) side of the machine, an elevating ram may be disposed between a lower edge of the outer frame and a location near the corresponding axle assembly or other part of the undercarriage framework that is supported by the radial travel wheels. Extending the hydraulic elevating rams raises the discharge end of the conveyor and allows the system to accommodate the increasing height of the stockpile. Special attention to the elevating rams is warranted. Conventional radial stackers can engage supports such as telescoping support arms at various convenient heights using pins or other fasteners that will inhibit lateral sway; conventional stackers, however, do not require elevation changes every few minutes. Any of several techniques may be used to prevent hydraulic fluid from flowing freely between the two cylinders to de-stabilize the system with possible catastrophic failure. Separate synchronizable pumps may be fitted to each ram. Normally closed power operated stop valves may be situated at the discharge of each cylinder to prevent fluid from flowing except when the valves are opened by the operator to adjust the height. Other techniques may include a system of check valves which may be augmented by pressure regulators to control the release of hydraulic fluid.

The feed end of the conveyor is supported by a pivot plate set onto a suitable flat area of the ground. A counterweight that weighs about 12,000 pounds keeps the stacker feed end in contact with the ground-mounted pivot plate, even when the belts are filled with product. The pivot plate may be fitted with suitable polymer pads or strips to reduce friction as the machine pivots. The counterweight allows the radial travel wheels to be located closer to the pivot point than would otherwise be possible. The small radius described by the radial travel wheels reduces the amount of space which must be kept free of stockpiled product and increases the area available for product storage. This increased storage capacity significantly enhances the efficiency of the storage system.

Several factors contribute to the ability of the machine to reach farther than does the usual telescopic conveyor. First, the integrity of the telescoping portion, or stinger is maximized by careful design. Where it is advantageous to do so, particularly with the bottom chord which is in compression, the structural members are made from rectangular tubing rather than the angle stock that is conventionally used. Advantages obtained with the technique include: there is much less build-up of material and resulting increase to dead weight; the machine stays cleaner, and the structure is more resistant to buckling. The top chord, however, may be formed satisfactorily from angle stock. Also, it may be desirable to vary the thickness or other dimensions of the structural members over their length. For example, the top chord may be made using 10.2 cm×15.2 cm (4"×6") angle for the first 12.2 m (40 feet) and 10.2 cm×10.2 cm (4"×4") stock for the second 12.2 m (40 feet) of length. The bottom chord may be made from 10.2 cm×15.2 cm×12.7 mm (4"×6"×½") wall rectangular tubing for the first (innermost) 6.1 m (20 feet) with the wall thickness reducing to 9.5 mm (⅜") for the second 6.1 m (20 feet), to 6.4 mm (¼") for the third 6.1 m (20 feet) and to a 4.8 mm (³⁄₁₆") wall for the final 6.1 m (20 feet).

Another feature of the stinger is a design in which all of the heaviest compression loads are carried by the shorter, more rigid, lattice members of the Pratt trusses. The heaviest compression loads occur in the region between the primary truss rollers and the secondary truss rollers. This design allows the extension rollers to be situated closer together which increases the overall length of the extended conveyor.

The stinger is fitted with tubular rails that extend laterally from the lower corners of the framework. A pair of tandem walking beam rollers at the discharge end of the outer framework engage the bottom of each stinger rail. A second pair of tandem walking beam rollers engage the top of each rail. The second roller set is situated about 12 feet from the discharge end of the outer framework. Adjustments can be made to the rollers to obtain good performance and to compensate for wear. The reduced overlap of only 12 feet, compared to the 15 to 18 feet that previous conveyors required, allows the reach of the stinger to be extended significantly.

Alignment of the stinger truss is aided by using a mill-finished rectangular tubular rail to carry the stinger along the rollers. The tolerances of the tubing are much more precise than the tolerances that may be obtained practically from a fabricated load-bearing alignment member. Some prior apparatus use rollers on the bottom of the stinger truss and inwardly disposed rollers contacting the top of the stinger truss to hold the stinger as it moves in and out. Another advantage of the rectangular tubing rail is that only the bottom chord of the truss is required to have sufficient strength to withstand the bending loads imposed by the rollers. The result is that the top chord carries only tension loads which makes it possible to use lighter angle materials instead of heavier tubular material. By locating the rails against the sides of the stinger framework, it is possible to make the tandem roller walking beam roller assemblies using high performance flanged track rollers (cam rollers); the roller flanges resist stinger side loads. Each walking beam roller assembly may have a static load capacity of about 100,000 pounds. Not only does the walking beam assembly reduce the effect of surface irregularities and other rail imperfections, the assemblies are fully independent both front-to-back and side-to-side. The independence minimizes the transmission of shock through the members and tends to reduce the effect of cumulative defects.

Another technique that may be incorporated into the various embodiments is to form the secondary conveyor sections with a camber to compensate for the dead weight of the structure. A member that is 24.4 m (80 feet) long may be formed with a 7.6 cm (3") camber. When extended, the dead weight of the truss assembly will cause enough deflection to make the conveyor section straight. There may be some observable deflection depending upon the angle at which the unit is set and the amount of the live load.

The deflection and the overall weight of the live load that the stinger carries is reduced by reducing the live load. When stacking 907,200 kg (1000 tons) per hour, the main conveyor belt runs at 122 m (400 feet) per minute. The stinger belt, however, runs at 183 m (600 feet) per minute. The faster secondary lowers the material profile and reduces the live load by 33%.

A single hydraulic source is provided that can power jacks that lift the pivot end when connecting the unit to a tractor for re-location, the elevating rams, the radial travel wheel booms, the radial travel drives, and the stinger positioner.

Longitudinal movement of the stinger section is effected by a stinger positioner that is affixed to the lower end of the stinger section. Configuring the stinger winch mechanism on the inside of the stinger itself makes it possible to lengthen the stinger somewhat because there is no requirement to provide space for that winch mechanism at the lower end of the primary frame. The positioning apparatus is comprised of a hydraulic motor and speed-reducing planetary gear set powered winch drum that has a wire rope wound on it.

The winch drum may have two wire ropes attached to it and extending in opposite directions from the winch drum. The other end of each rope would be affixed to opposite ends of the primary conveyor frame so that when the stinger is fully retracted, one end of the retract rope would be connected to the feed end of the primary conveyor and the rope would be fully wound onto the drum with the end affixed to the drum. Although displaced axially along the winch drum by a distance to avoid unnecessary wear, the extend rope would wind onto the drum from the opposite direction at the same radial point from which the retract rope unwinds tangentially from the drum.

In an alternative embodiment, one end of the wire rope is connected to the discharge end of the main conveyor. The other end of the wire rope is connected to the feed end of the main conveyor after several turns of rope have been placed around the winch drum. The hydraulic motor can turn the drum either direction thereby un-winding rope on one side and winding the wire rope on the other side to either retract or extend the stinger. The winding drum may be grooved to receive the wire rope; it may also be practical to fashion the drum with a smooth rope-contacting surface.

A variety of other mechanisms may also be used with equivalent stinger positioning effect. For example, the stinger could be moved by turning one or more screws that extend the length of the primary conveyor. The stinger could be moved by a cogwheel that engages a gear rack extending for the distance of travel. Hydraulic rams could either directly or with suitable blocks and tackle move the stinger. It would also be possible to extend and retract the stinger with a reciprocating pawl attached eccentrically to a rotating gearmotor shaft. The pawl could sequentially engage a linear array of dogs extending substantially the length of the primary conveyor. Reversing could be effected using automatic devices. Other methods for positioning the stinger include use of a chain fall or hoist engaged with a chain that runs from the discharge end of the primary conveyor to the feed end. The winch could alternatively be reeved on parallel "V" grooved wheels in a similar manner to that used with electric passenger and freight elevators.

An "E-chain" interconnects the primary and secondary conveyor structures. The E-chain holds the flexible hydraulic hoses that power the stinger positioner drive, the electrical power supply cord that powers the conveyor belt drive motor, and the signal leads that connect the zero belt speed sensor and the tilt sensor to a control panel. Although it is known that an E-chain may be conveniently used to retain the hydraulic and electrical lines, any of the several other equivalent means that may include guide rods, screen, cages, armor, etc. may be used as well. The required functionality is primarily to prevent the power and signal lines from becoming damaged through accidental contact with the other moving and fixed parts of the system by confining the movement of the power and signal lines to a plane that is spaced apart from, and parallel to, the axis of stinger movement.

Among the advantages of operating the stinger positioner drive with hydraulic power instead of electric power are the small size and light weight of hydraulic motors, the ability of hydraulic motors to withstand repeated start, run, stop/stall cycles under full load in either direction without being damaged, and the ability to control positions with precision. It is to be understood, however, that electric, pneumatic, and other types of drive systems are equivalent to the hydraulic system of this disclosure. Extending and retracting the stinger may be controlled manually by an operator or automatically by an automatic control system.

One automatic control system uses interval timers to periodically open solenoid-operated hydraulic valves for specific lengths of time so that the stinger will move a specific distance in the desired direction along its longitudinal axis and so that the radial drive wheels will advance the conveyor angularly about the pivot. When the conveyor reaches an end of the arc along which it travels, the elevating mechanism can be activated manually or automatically to raise the discharge end of the conveyor by an appropriate distance; the direction of radial wheel travel will also be reversed.

Another method of controlling the formation of stockpiles is to use a Programmable Logic Controller (PLC). Such a system may set timers to control when and for how long the respective valves should remain open. Alternatively, the PLC may activate motors and positioners in response to input from sensors that respond to changes of the controlled component. It is also possible for the controller to use other information to affect or override various commands and sensed conditions. For example, the system could receive signals from a sensor that detects the presence of material in the feed hopper and the controller could provide that if the feed hopper is empty for 45 seconds, pause all position control timers. The PLC can control many aspects of the stockpile the telescoping radial stacking conveyor makes. Among other things, the PLC can provide instructions that will cause the stacker to form a stockpile that is rectangular rather than arcuate; it can place the stored material in discrete piles, windrows, concentric arcs, or distribute the material to evenly fill an irregular container such as the hold of a ship, or to fill various bulk material containers, barges, rail cars, and other vessels.

Other equivalent positioning systems may be used to control the position of the stinger relative to the main conveyor, to control the height of the primary conveyor discharge, and to control the radial displacement of the stacker by operating the radial travel wheels.

The radial travel wheels may be powered or unpowered. When powered, it is believed preferable to use hydraulic power although other motors, engines, winches, or separate vehicles may be used to move the stacker radially on the pivot.

Various sensors, controls and alarms may be provided to detect and correct out of tolerance positions or responses. For example, a stopped belt sensor is fitted on the stinger belt to prevent the damage that could come from the main belt continuing to deliver material to a stinger that is not in operation. A belt could be ruined and other components could be harmed. When the stinger belt sensor detects that the stinger belt is not moving, it should immediately shut down the primary conveyor.

The stinger positioner drive may be shut off by limit switches mounted at both the inboard and the outboard ends of the stinger travel range. In addition to electrical limit switches, mechanical blocks have been configured to retain the components in the unlikely event of failure of both the electrically operated control and the limit switch systems. By selecting appropriate power and torque ratings for the hydraulic positioner drive motor, mechanical limit blocks could assure that the winch does not over-drive the stinger past the design limit.

A tilt sensor, or high stack sensor, is provided at the discharge end of the stinger to provide enhanced functionality and operational flexibility. The tilt sensor is a position-sensitive switch that depends from the lower end of a short chain or rod that is swingably mounted from a point near the stinger belt discharge. A chain or rod about three feet long is generally satisfactory, but other lengths could be used instead. When the height of the pile approaches the discharge of the stinger conveyor, the accumulating material will impinge on the tilt sensor hanging from the end of the conveyor frame and deflect it angularly. When the amount by which the tilt sensor is deflected from vertical reaches 15 degrees or more, it signals the controller to move the stinger to the next location. In this optional operating mode, the sensor implements the option of moving the conveyor discharge in response to the presence of stockpiled material rather than simply advancing the discharge point incrementally at pre-set time intervals. The advantage of this option is that uniform stockpiles can be made even if the material is delivered to the stacker in uneven surges.

When the system operating mode is set to move the conveyor discharge point after a specific time interval, the sensor may be used as a high stack limit switch to halt the conveyor if the system were unable to move the conveyor discharge to a location where additional material were needed.

Likewise, when the system is operating manually, the tilt sensor may be used as a high stack limit switch to alarm or shut down the system if the operator does not, for any reason, do so.

The belts, troughing rollers, and return idlers are standard sizes and meet all applicable CEMA requirements, guidelines, and standards. It is to be understood that other features may be incorporated into articles made according to this disclosure. For example, it may prove desirable to provide additional telescoping stinger sections. The design of the primary and secondary conveyors is readily adapted to receiving a third conveyor assembly that may be shorter than the secondary conveyor. The interior of each of the conveyor truss sections is clear below the return idlers which provides a region in which a third conveyor section could be mounted within the secondary conveyor in a manner similar to the way the secondary conveyor is mounted inside the primary conveyor.

Although the designs illustrated may be adapted for such use, it is possible that other truss designs and other materials would be used in part or all of a telescoping radial stacking conveyor that has three or more conveyor sections. For example, it may be necessary to fabricate part or all of the structures using specially formulated or specially treated materials to obtain structures of sufficient strength while also keeping the overall weight of the system low enough to be transported over public roadways.

BRIEF DESCRIPTION OF THE DRAWINGS

FIG. 7 is a side elevation detail of the stinger truss showing the feed end and about 25% of the length of the stinger.

FIG. 8 is a bottom view of the stinger depicted in FIG. 7.

FIG. 9 is a side elevation detail showing the discharge end of the main conveyor truss.

FIG. 18 is an elevation view of the telescoping radial stacker and stockpile of FIG. 17 wherein the stockpile has been built to fully minimize segregation of material by size.

FIG. 19 is an elevation view of the telescoping radial stacker and stockpile of FIG. 17 wherein the stockpile has been built to partially minimize segregation of material by size.

DETAILED DESCRIPTION OF THE DRAWINGS

Figure 1:
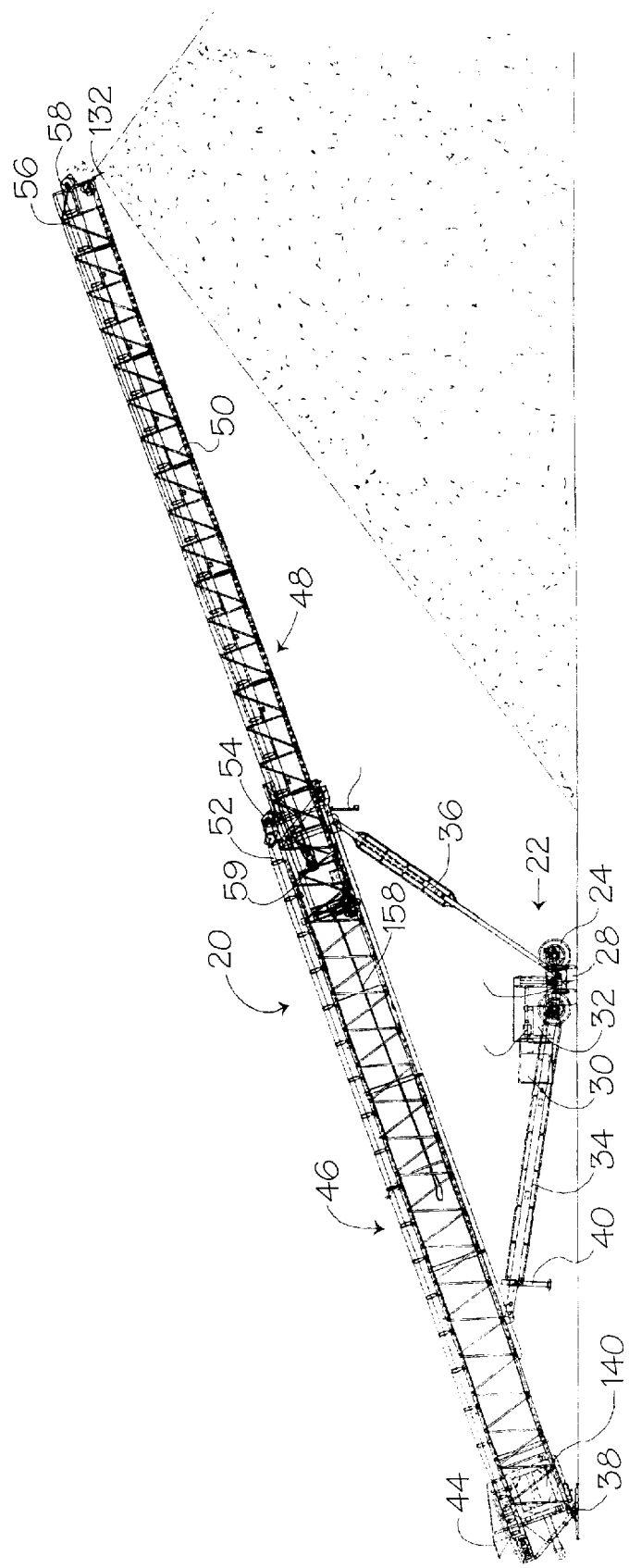
FIG. 1 is a side elevation view of the portable telescoping radial stacking conveyor in the fully elevated, fully extended, operational configuration.

Viewing first, FIG. 1, a fully extended, fully raised, portable telescoping radial stacking conveyor 20 is depicted in side elevation. The portable telescoping radial stacking conveyor 20 is comprised of an undercarriage 22 that serves as the operable mounting for the transport wheels 24 mounted on either end of a portable radial axle assembly 26. Radial travel wheels 28 are mounted at the distal end of outriggers 29 that may be operated from the control module 30. A hydraulic fluid reservoir 32 and hydraulic pump 33 may conveniently be mounted near the control module 30 or at other locations. The outriggers 29 are pivoted downward by hydraulic rams to bring the radial travel wheels 28 into contact with the ground and to lift the transport wheels 24 away from contact with the ground.

Each side of the undercarriage 22 includes a fixed-length trailing link 34 that extends forwardly from, and an elevating strut 36 extending rearwardly from, the corresponding end portion of the portable radial axle assembly 26. The pivot plate 38 fixes the location of the machine and the resultant stockpile. Two jacks 40 are provided, one being mounted on each side of the portable telescoping radial stacking conveyor 20 near each of the trailing link 34 ends opposite from the portable radial axle assembly 26. A set of brake lights and turn signals 42 is mounted on each side of the portable telescoping radial stacking conveyor 20 near each of the elevating strut 36 ends opposite from the portable radial axle assembly 26.

Figure 2:
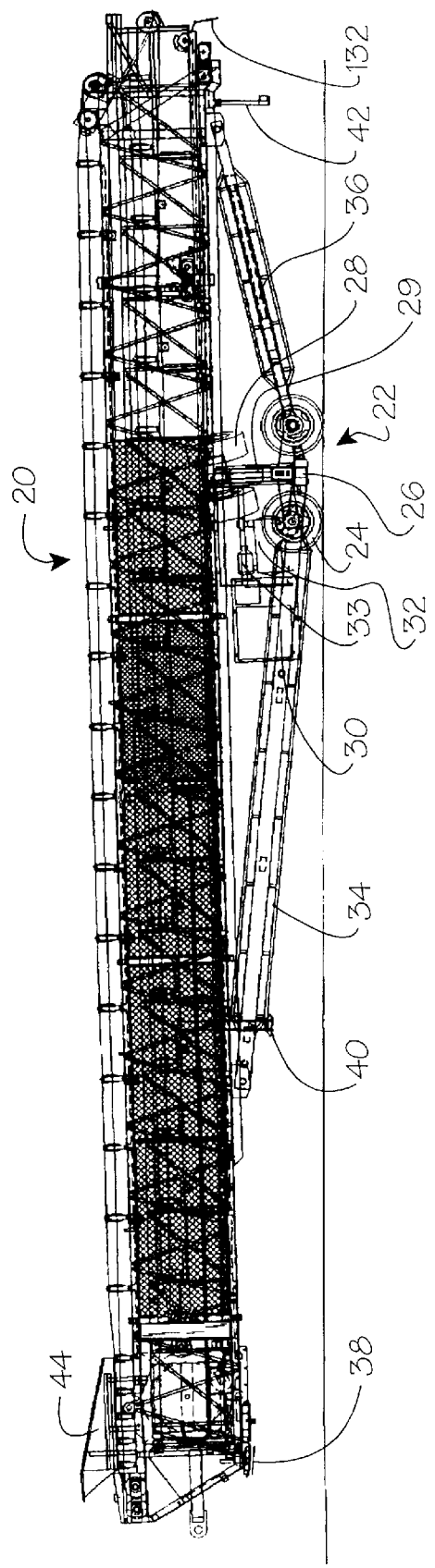
FIG. 2 is a side elevation view of the portable telescoping radial stacking conveyor of FIG. 1 in the fully retracted, fully lowered, transport configuration.

The difference between the extended positions of the jack 40 and the elevating struts 36 is readily appreciated by viewing FIG. 2 which is a side elevation view of the portable telescoping radial stacking conveyor of FIG. 1 in the fully retracted, fully lowered, transport configuration.

An infeed hopper 44 is situated directly above the pivot plate 38 at the feed end of the main conveyor 46. The secondary conveyor (also called the stinger) 48 fits inside the framework of the main conveyor 46. The stinger truss lattice 50 is designed to extend from and retract into the main conveyor 46, or reciprocate, directly below the main belt 52.

Figure 3:
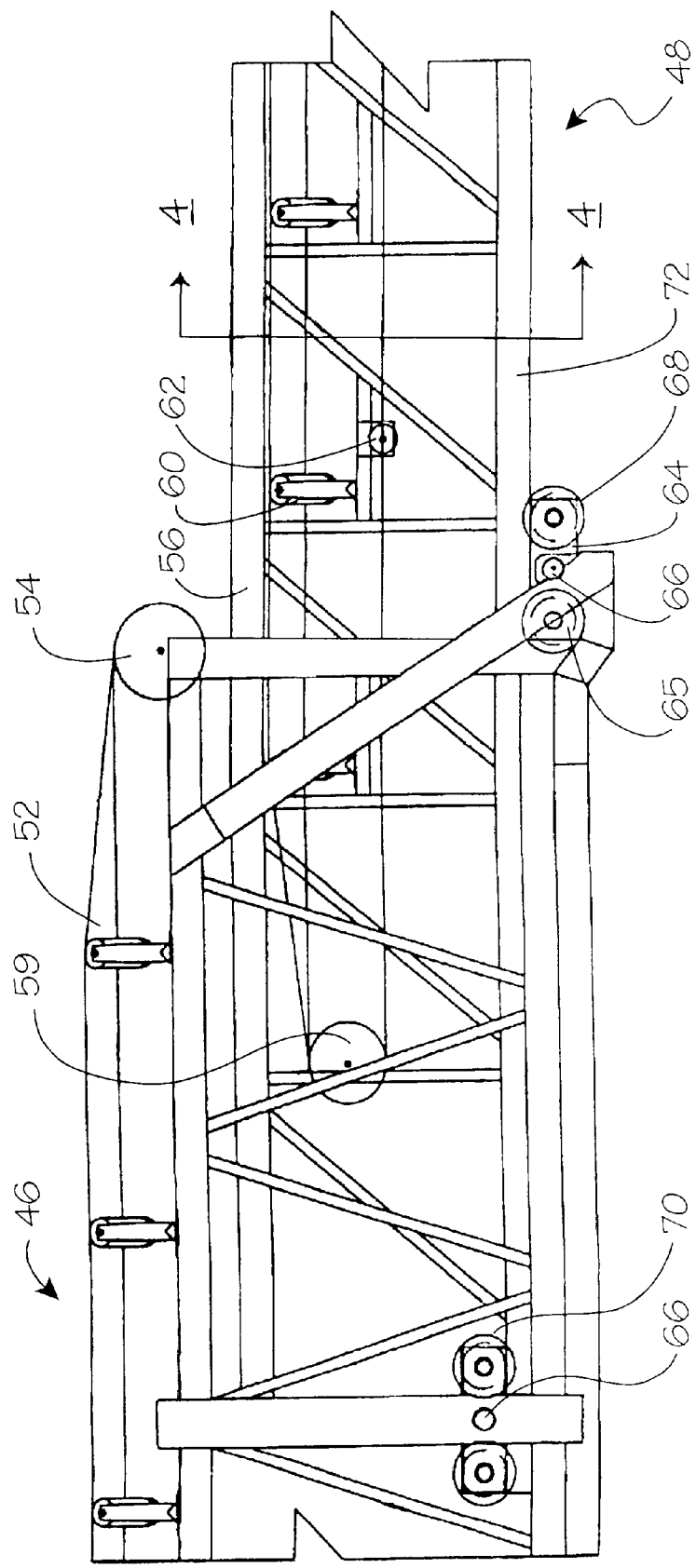
FIG. 3 is a side elevation detail of the portable telescoping radial stacking conveyor of FIG. 1 showing the main conveyor discharge end and the stinger feed end.

FIG. 3 is a side elevation detail of the portable telescoping radial stacking conveyor of FIG. 1 that shows more clearly the relationship between the main belt 52 which discharges material at the main belt drive roller 54 mounted at the discharge end of the main conveyor 46 and the stinger belt 56 which advances from the stinger feed end roller 59 receives the product discharged by the main conveyor 46.

The stinger belt 56 runs just below the main belt 52 so that all material discharged by the main conveyor 46 falls immediately onto the stinger belt 56 which is advanced at the rate of approximately 3 m/s (600 feet per minute) by the stinger belt drive roller 58.

Figure 4:
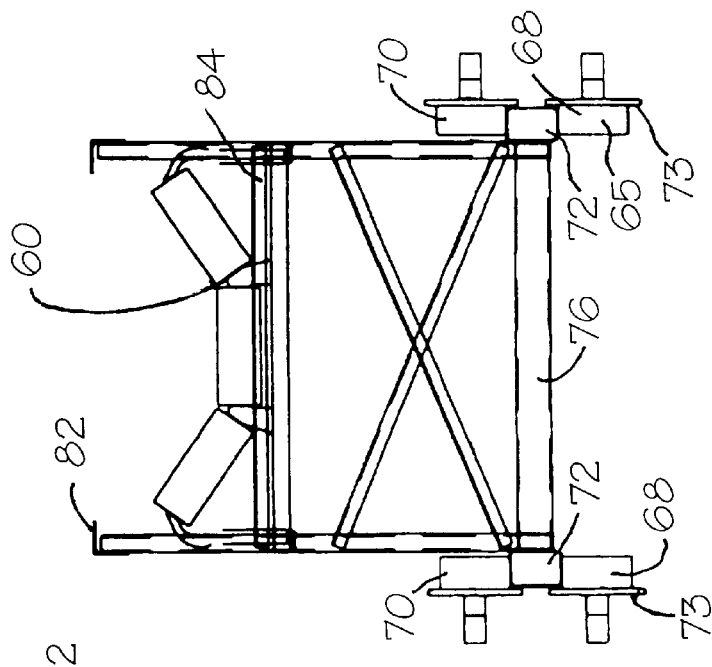
FIG. 4 is a cross-sectional view of the stinger taken at 4—4.

Troughing roller sets 60 are spaced at intervals of 1.2 m (4.0 feet) on both the main conveyor and the stinger. The troughing roller set 60 shown in FIG. 4 shows an exemplary sectional view of those load bearing conveyor. Return idler rollers 62 are spaced at intervals of 2.4 m (8.0 feet) on both the main conveyor and the stinger. The usual return idler roller 62 is a generally straight, cylindrical body rather than the "U"-configured, triplex troughing roller sets 60 that support the fully loaded belt.

FIG. 3 also shows elements of the support mechanism for the reciprocating stinger 48. Two pairs of truss roller walking beam 64 assemblies support the stinger 48. Each truss roller walking beam 64 assembly is fitted with two high performance flange rollers 65, one on either end. The truss roller walking beam 64 is mounted to a truss roller walking beam pivot 66 affixed to the main conveyor 46 at the two lower corners of the longitudinal terminus of the discharge end of the rectangular main conveyor 46 section. The primary truss rollers 68 are comprised of a pair (left and right) of truss roller walking beams 64, each with a pair of high performance flange rollers 65. The secondary truss rollers 70 are mounted low on the sides of the main conveyor 46 and spaced longitudinally about 3–4 m (10–14 feet) from the primary truss rollers 68. Both the primary truss rollers 68 and the secondary truss rollers 70 use the same truss roller walking beams 64, high performance flange rollers 65, and truss roller walking beam pivots 66. The forces exerted upon the primary truss roller 68 and secondary truss roller 70 by the extended stinger bottom truss chord 72 are, however, in opposite directions.

The primary truss roller 68 contacts the bottom surface of the stinger bottom truss chord 72 and is loaded with a vertically downward force at all times. Although the secondary truss rollers 70 may have substantial pre-load, no working load is applied to the secondary truss rollers 70 by the top surface of the stinger bottom truss chord 72 until the stinger is extended to about half its length, or approximately 10 m (34 feet).

FIG. 4 shows a cross-section of the stinger 48 taken at 4—4 of FIG. 3, and the vertical relationship between a primary truss roller 68, a secondary truss roller 70 and stinger bottom truss chord 72 may be clearly seen.

Each of the high performance flange rollers 65 has a truss roller flange 73 that can contact the outer vertical side of the stinger bottom truss chord 72. Lateral and vertical adjustments can be made to the positions of the primary truss rollers 68 and the secondary truss rollers 70 to compensate for wear and to maintain the axial alignment of the main conveyor 46 and the stinger 48. In addition, the inboard ends of the stinger bottom truss chord 72 may be fitted with glides or rollers to reduce noise and wear. It is also possible to fit the bottom or the sides of the main conveyor 46 with rollers or glides (not shown) to prevent the portion of the stinger that moves into the main conveyor 46 from dragging on and rubbing against components of the main conveyor 46.

The stinger bottom truss chord 72 is the part that must have sufficient strength to transfer all loads imposed on the stinger 48 to the main conveyor 46. It is not sufficiently rigid to do so reliably. Other portions of the stinger must provide the needed rigidity. The stinger bottom braces 74 runs diagonally between succeeding stinger bottom cross members 76.

Figure 5:
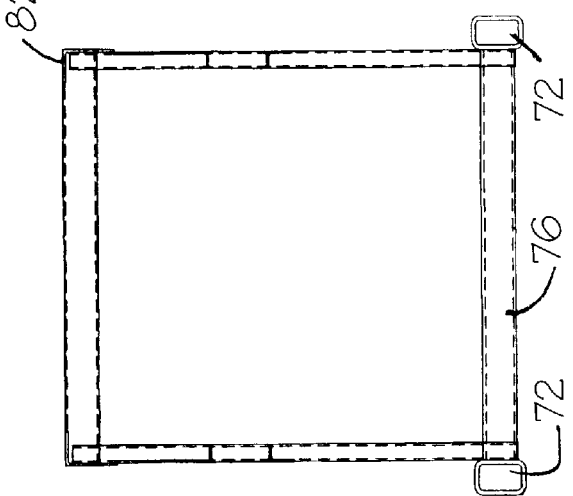
FIG. 5 is a cross-sectional view of the stinger taken at 5—5.
Figure 6:
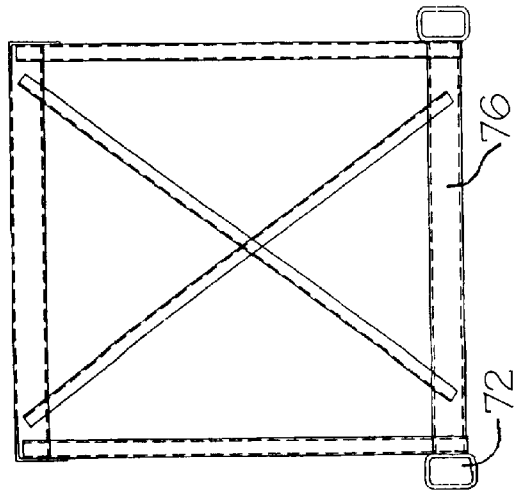
FIG. 6 is an end elevation view of the stinger section taken at 6—6.

FIG. 4, FIG. 5 and FIG. 6 are sectional views taken at 4—4, 5—5, and 6—6 of FIG. 7 is a side elevation detail of the stinger truss showing the feed end and about 25% of the stinger length. The shortest, perpendicular members of stinger truss lattice 78 are in compression load at all times whereas the diagonal members of stinger truss lattice 80 and the stinger top truss chord 82 are placed in tension. The stinger belt roller mount 84 attaches to the perpendicular member of stinger truss lattice 78 and diagonal member of stinger truss lattice 80 and may hold the troughing roller sets 60 on the upper surface and the return idler rollers 62 on the bottom surface.

In FIG. 9, there is presented a detail of the main conveyor 46 truss lattice and discharge end termination. The main conveyor bottom truss chord 86 is linked to the main conveyor top truss chord 88 by main conveyor truss lattice members 90. A main conveyor bottom truss chord offset 92 lowers the primary truss roller 68 to provide additional clearance inside the main conveyor 46. The main conveyor bottom truss chord offset 92 is strengthened by the main conveyor offset brace 94 which is affixed to the main conveyor discharge end reinforcement 96.

Figure 10:
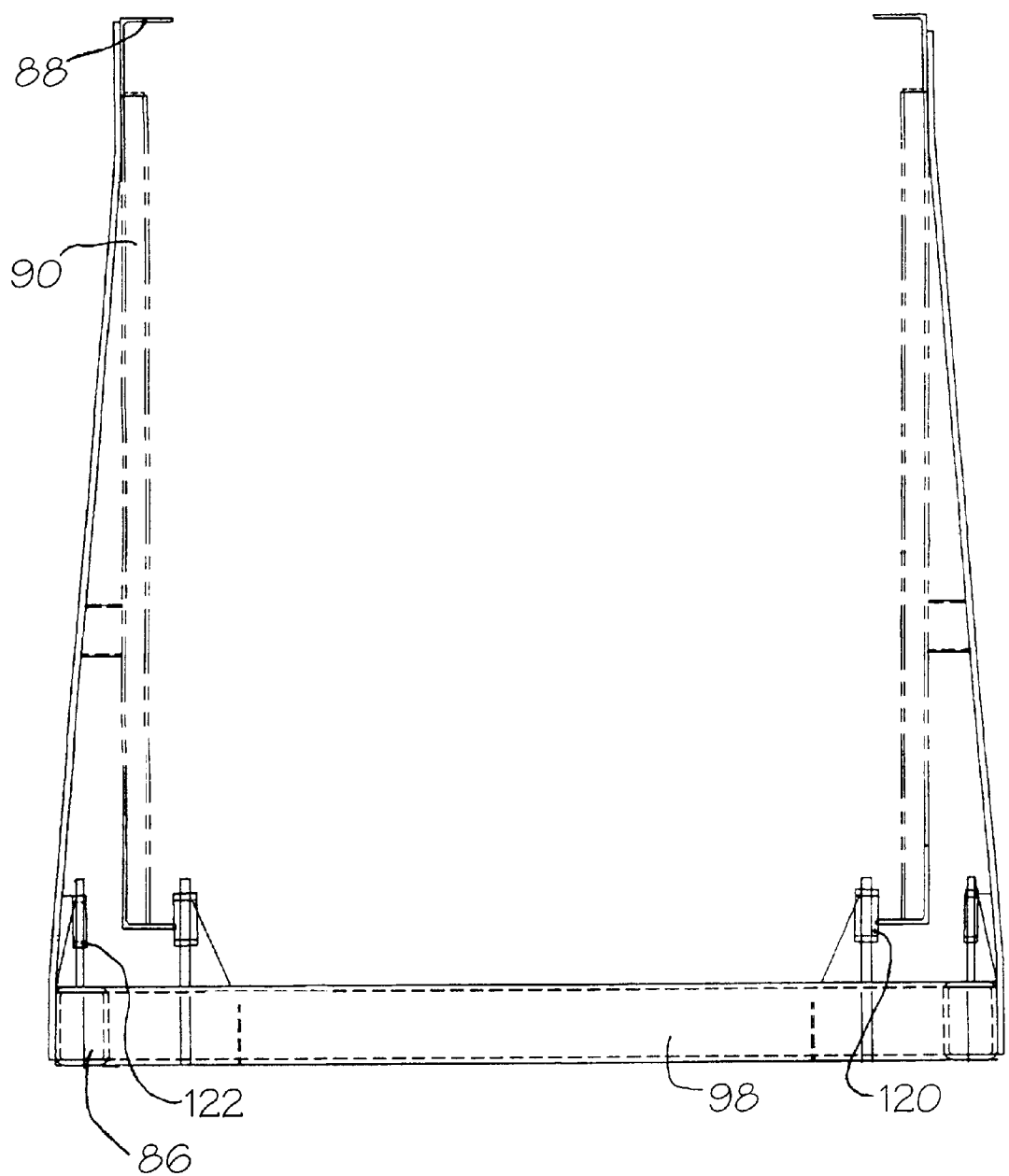
FIG. 10 is an end view of the discharge end of the main conveyor truss.

An end view of the main conveyor 46 discharge end of FIG. 9 is shown in FIG. 10 wherein the fitting of the main conveyor bottom cross member 98 with respect to the inboard truss roller bracket 120 and outboard truss roller bracket 122 is seen more easily. Trailer light mounting brackets 124 depend from the main conveyor bottom truss chord 86. All other towing requirements such as air brakes, spring brakes, fifth wheel, pintle hitch, turn indicators, etc. are explicitly included in this disclosure furnished, even if not specifically depicted in the various figures.

Figure 15:
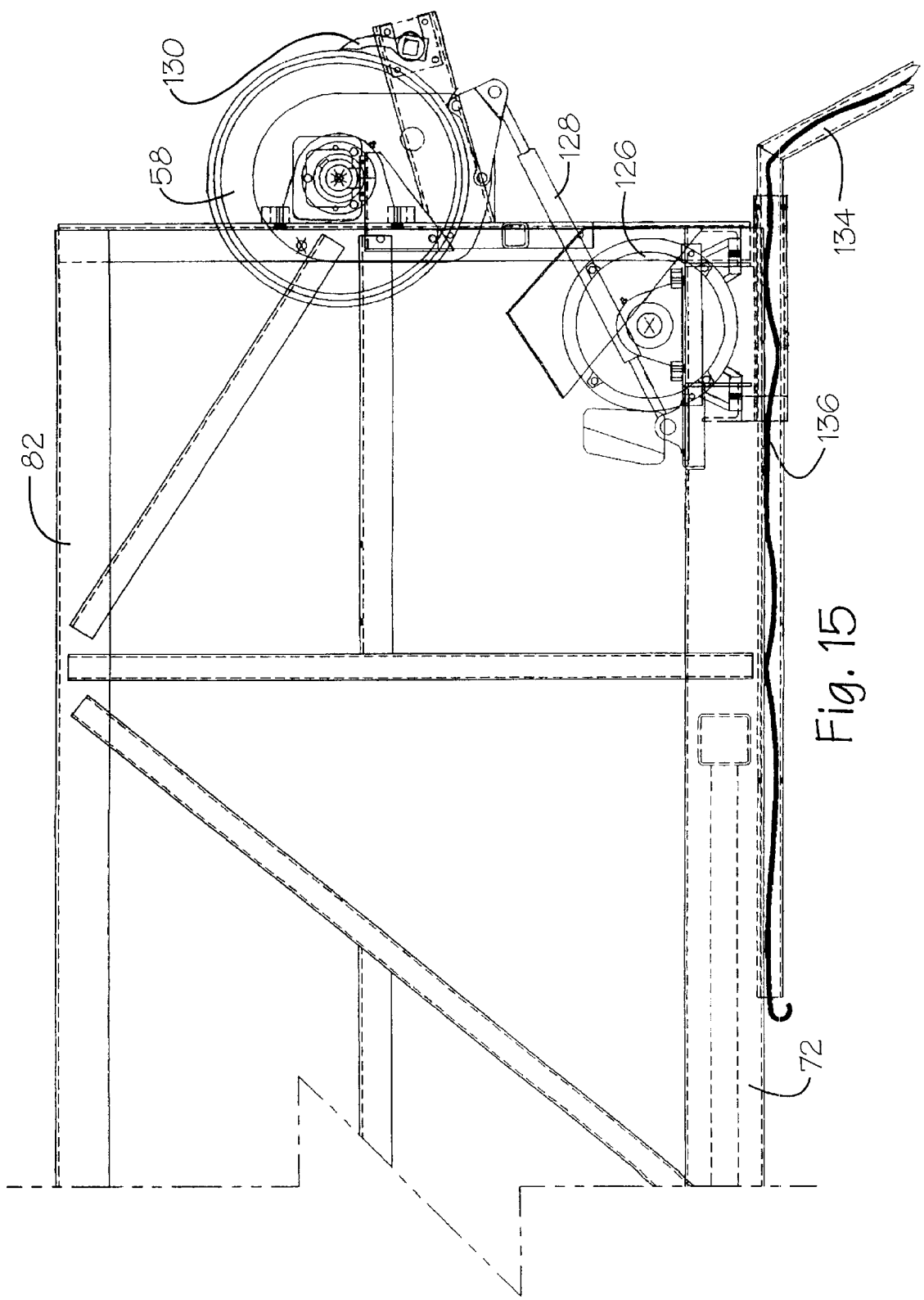
FIG. 15 is a side elevation detail of the stinger discharge end showing the mounted belt drive assembly.

In FIG. 15, a detail of the stinger 48 discharge end termination is shown. The stinger belt drive motor 126 can be of a variety of configurations, but is often a 30 horsepower electric motor equipped with a gear reducer and rotationally connected to the stinger belt drive roller 58 with one or more "V"-belts. A "V"-belt tightener 128 allows the proper tension to be maintained. A stinger belt scraper 130 may be provided to improve the performance of the portable telescoping radial stacking conveyor 20, especially when the material being stockpiled is wet or sticky.

A tilt sensor 132 (FIG. 1) is provided that depends about 1 m (3 feet) from a tilt sensor mounting arm 134. The tilt sensor signal wire 136 may be armored or otherwise protected by the same chain or tubing (e.g. hydraulic tubing) used to support the tilt sensor 132. In FIG. 1, may also be seen the 5,454 kg (12,000 pound) counterweight 140 that prevents the portable telescoping radial stacking conveyor 20 from tipping when it is fully extended.

Figure 16:
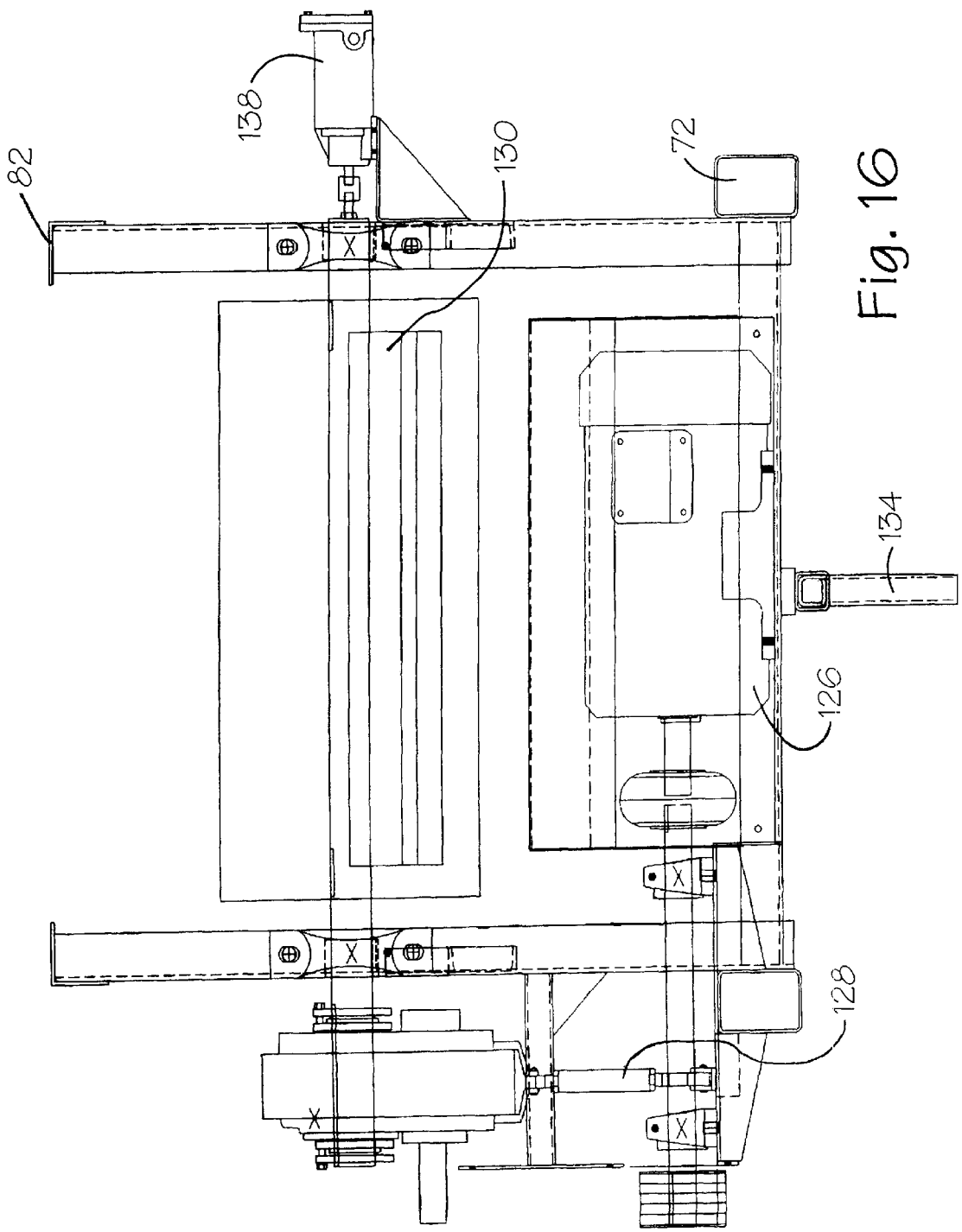
FIG. 16. is an end view of the stinger discharge end of FIG. 15.

In FIG. 16, an end view of the detail of FIG. 15, the zero speed sensor 138 is shown. If the stinger belt drive roller 58 stops, the zero speed sensor 138 will enable the main belt drive roller 54 to be shut down automatically.

Figure 11:
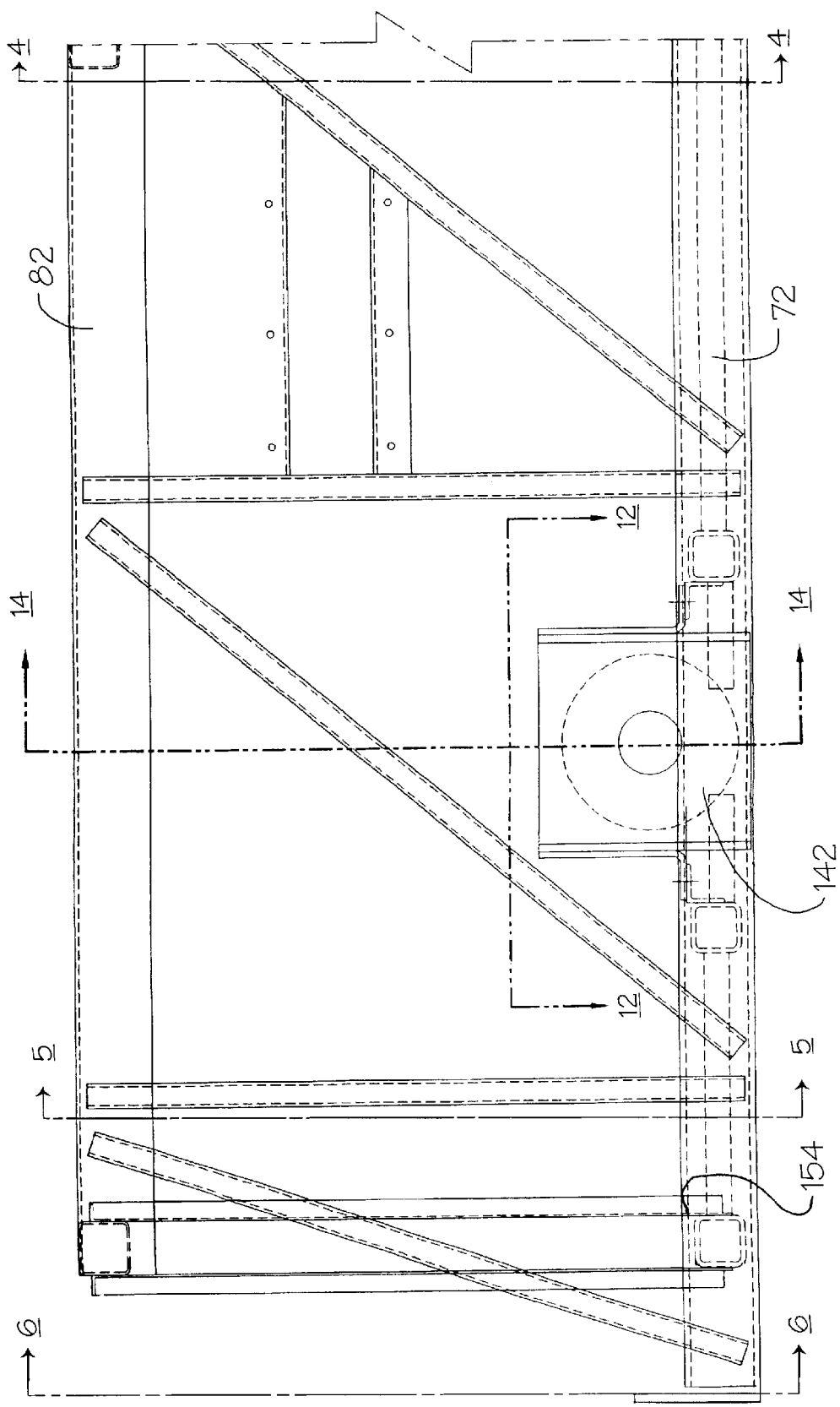
FIG. 11 is a side elevation view of the stinger truss showing the axial transport winch.
Figure 12:
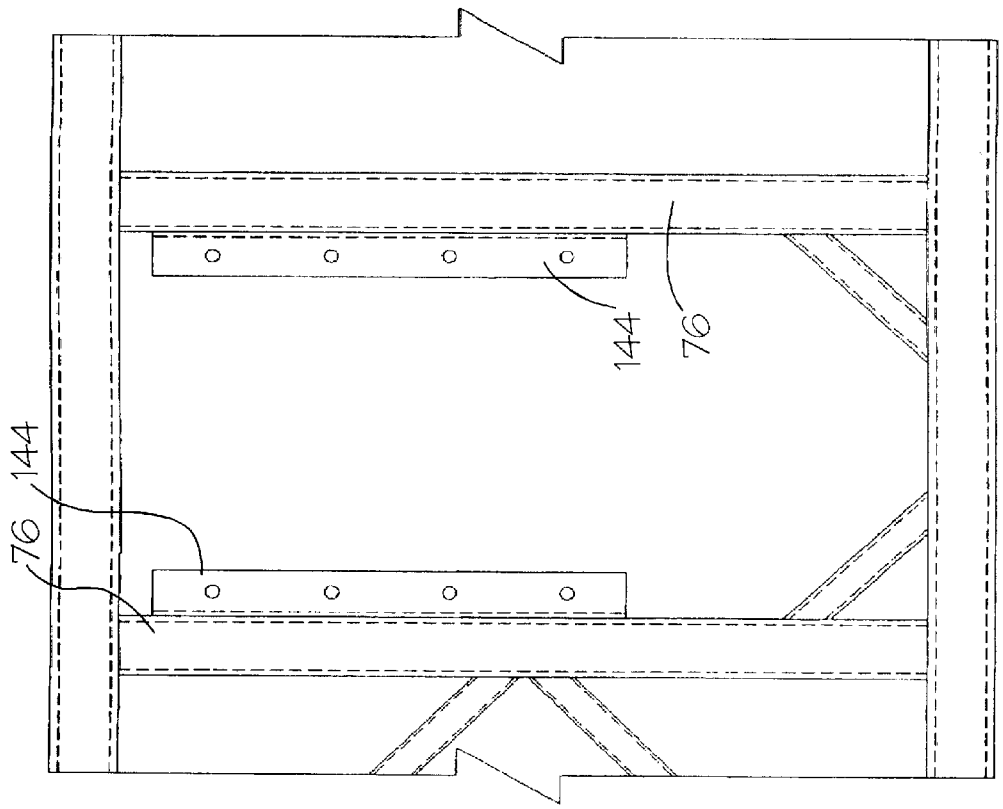
FIG. 12 is a plan view detail of the winch mount shown in FIG. 11.
Figure 13:
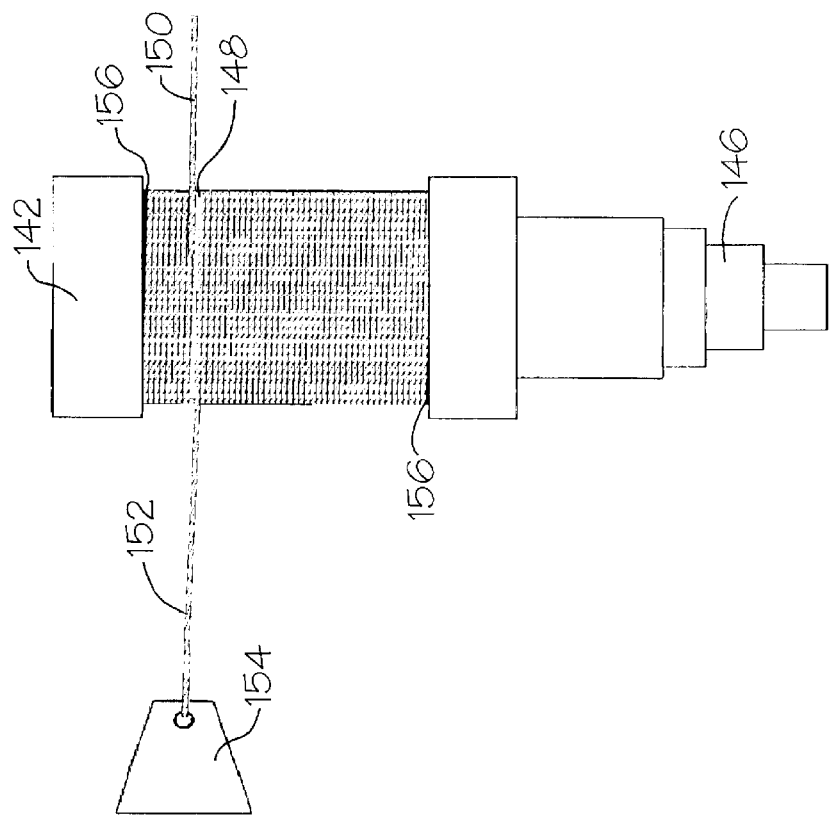
FIG. 13 is a plan view detail of the winch shown in FIG. 11.
Figure 14:
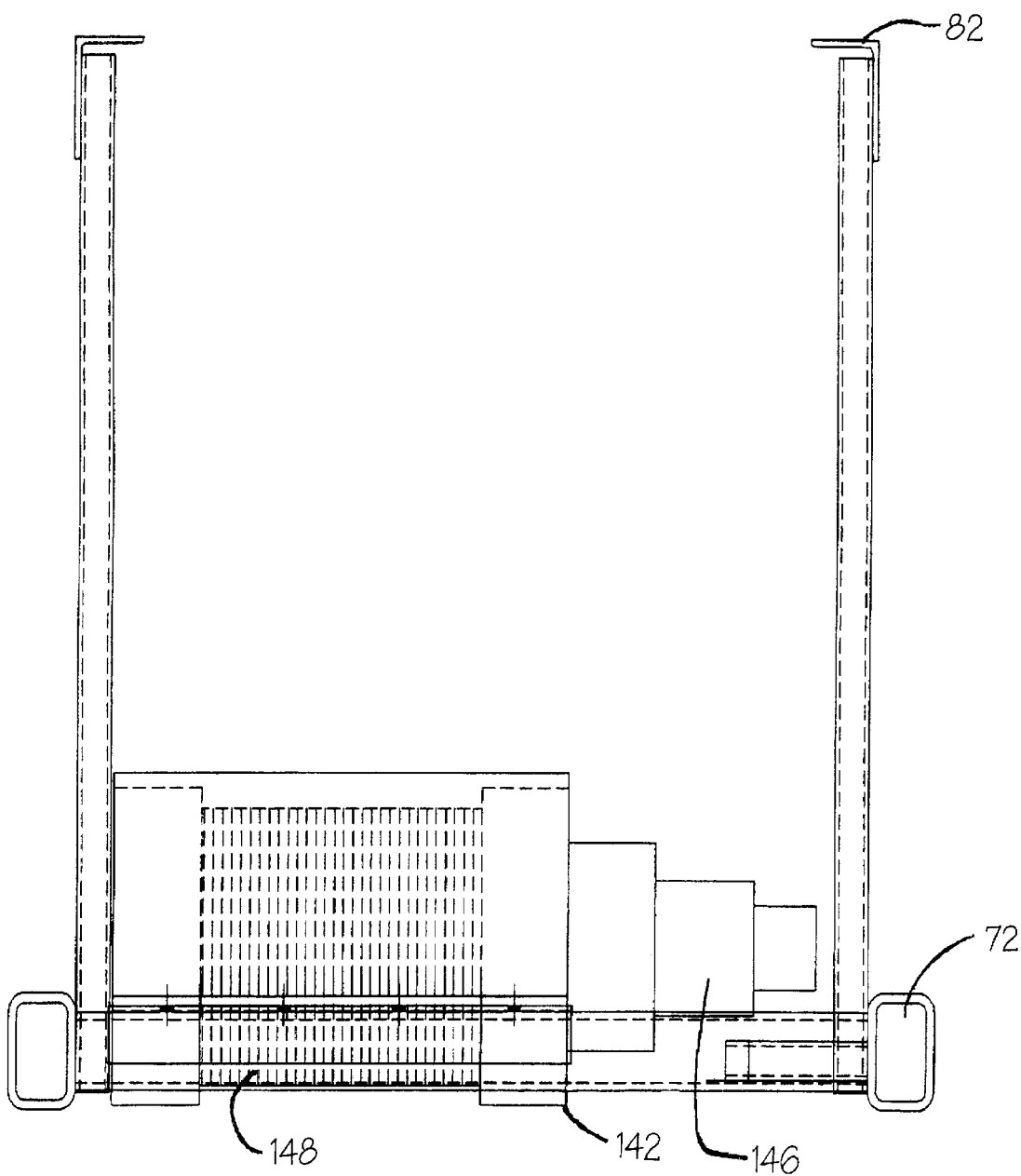
FIG. 14 is a cross-sectional view of the stinger of FIG. 11.

FIG. 11 shows the feed end of the stinger in greater detail than do FIG. 7 and FIG. 8. In particular, the stinger positioner (winch) 142 is shown. The stinger positioner (winch) 142 may be mounted on the winch base bracket 144 shown in FIG. 12. The winch hydraulic drive motor 146 is shown in greater detail in FIG. 13. It is to be understood that the stinger positioner (winch) 142 may be powered by pneumatic, gasoline, electric, or other means although it is believed that the winch hydraulic drive motor 146 is preferable.

A rope take-up drum 148 driven by the winch hydraulic drive motor 146 takes up extension (wire) rope 150 that is affixed at one end to the discharge end of the main conveyor 46 to advance the stinger 48 from within the main conveyor 46 truss lattice while an equal amount of retraction (wire) rope 152 is unreeled. The retraction (wire) rope 152 is affixed to the feed end of the main conveyor 46 by attachment to a retraction rope anchor tab 154. The extension (wire) rope 150 and retraction (wire) rope 152 may be separate pieces or unitary; if two ropes are used, a securement 156 can be used to connect one end of each rope to the rope take-up drum 148.

An "E-chain" 158 is a type of flexible raceway that, like the common roller chain used on bicycles, confines movement of the various conduits to two dimensions. The hydraulic hoses that deliver power to the winch hydraulic drive motor 146, the electric power conductors that power the stinger belt drive motor 126, and the signal lines that connect the tilt sensor and zero belt speed sensor to the control module 30 and PLC are bundled in an E-chain 158 to promote reliable operation of the entire system.

Figure 17:
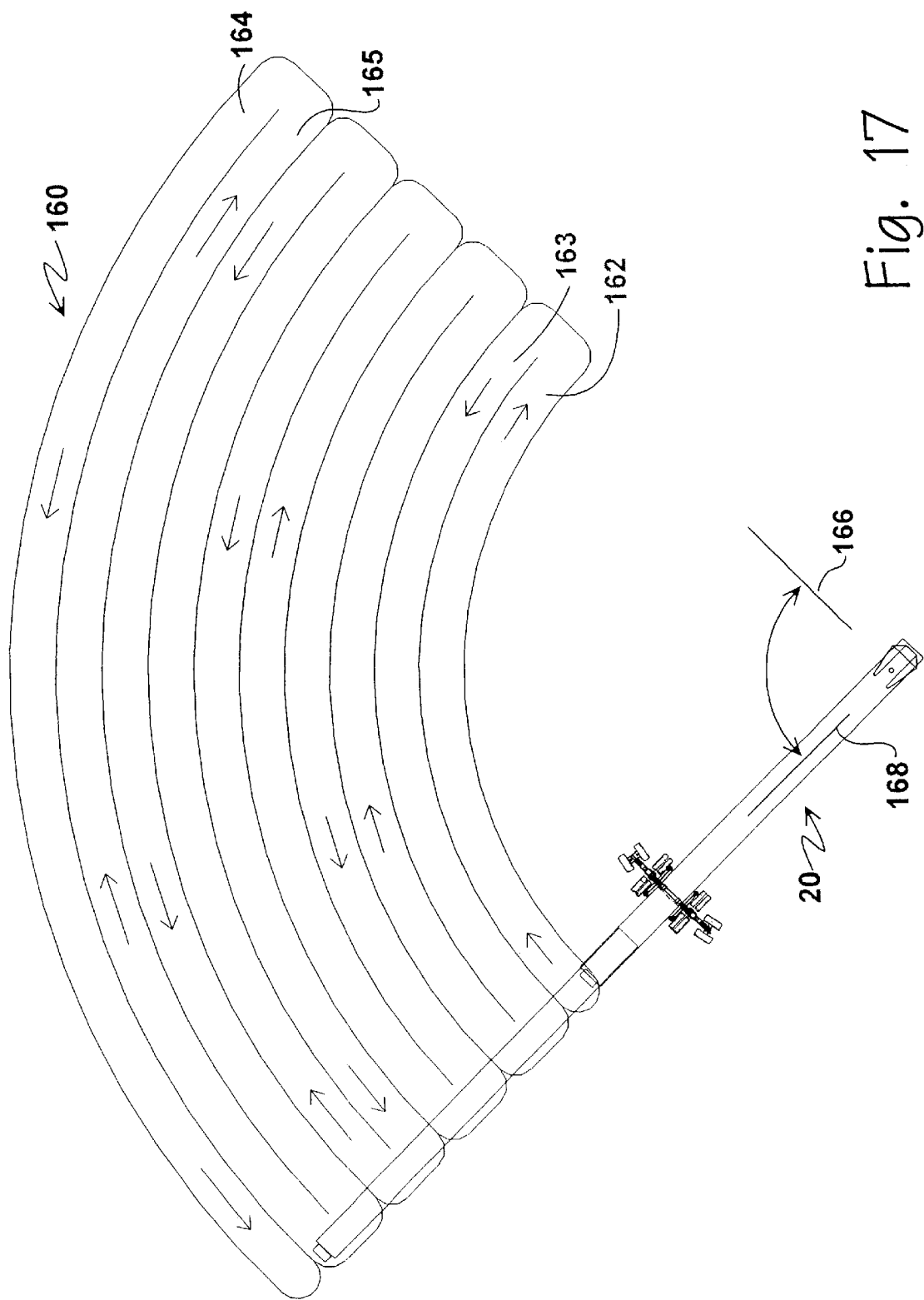
FIG. 17 is a plan view of the telescoping radial stacker and the base of an alternative arcuate row embodiment the stockpile formed by the telescoping radial stacker of FIG. 1.

FIG. 17 shows an example of one type of bulk material stockpile 160 that the control module 30 and PLC can be used to make. The telescoping stacker 20 starts the stack at a minimum radius to form an inner arcuate base row 162 then the stinger is extended a few feet to begin forming the first intermediate arcuate base row 163. The outer arcuate base row 164 is established either by the specification of the machine operator or by the maximum extension that is possible for the telescoping stacker 20 with the intervening area being occupied by a second intermediate base row 165 and subsequent like rows of material.

The first terminus of arcuate travel 166 and the second terminus of arcuate travel 168 may be set as part of a site-specific PLC program, a commonly applicable default, or over-ridden manually depending on the prevailing needs.

FIG. 18 is an elevation view of the telescoping radial stacker 20 and stockpile 160 of FIG. 17 wherein the machine has been controlled to build an arcuate row stack that minimizes segregation of material by size 170. Once the first layer of material has been deposited in concentric arcs, an arcuate second layer inner row 172 may be added that has a slightly larger radius than the first base row 162. An arcuate second layer first intermediate row 173 can be added adjacent the arcuate second layer inner row 172. The arcuate second layer outer row 174 will be deposited at a distance from the pivot 38 that is less than the maximum extension of the stinger, and that is also closer to the pivot than is the outer arcuate base row 164. An arcuate second layer second intermediate row 175 and subsequent intermediate rows complete the second layer of the stack 170. The arcuate third layer inner row 176 begins more distant from the pivot 38 than does the preceding layer, and so on until a top layer row 178 terminates the stack.

FIG. 19 is an elevation view of the telescoping radial stacker and stockpile of FIG. 17 wherein the stockpile has been built to partially minimize segregation of material by size. This arcuate row stack that partially minimizes segregation of material by size 180 is formed similarly to the fully size-segregation minimizing stack 170 except that the stinger 48 is extended to the distance of the outer arcuate base row 164 at each layer. There is, as a result, a second arcuate layer overrun 182 in which some degree of size segregation could occur as the material flows down the stack increasing the area covered by the stack 180. It is to be appreciated that the third arcuate layer overrun 184 and each subsequent layer until the arcuate row stack overrunning top layer 186 increase the volume and area of the stack compared to the arcuate row stack that minimizes segregation of material by size 170 but that size segregation is likely to increase with increasing overruns. The tilt sensor 132 can be used to raise the outboard end of the conveyor 20 at either end 166 168 of the arc through which the conveyor is programmed to travel.

Figure 20:
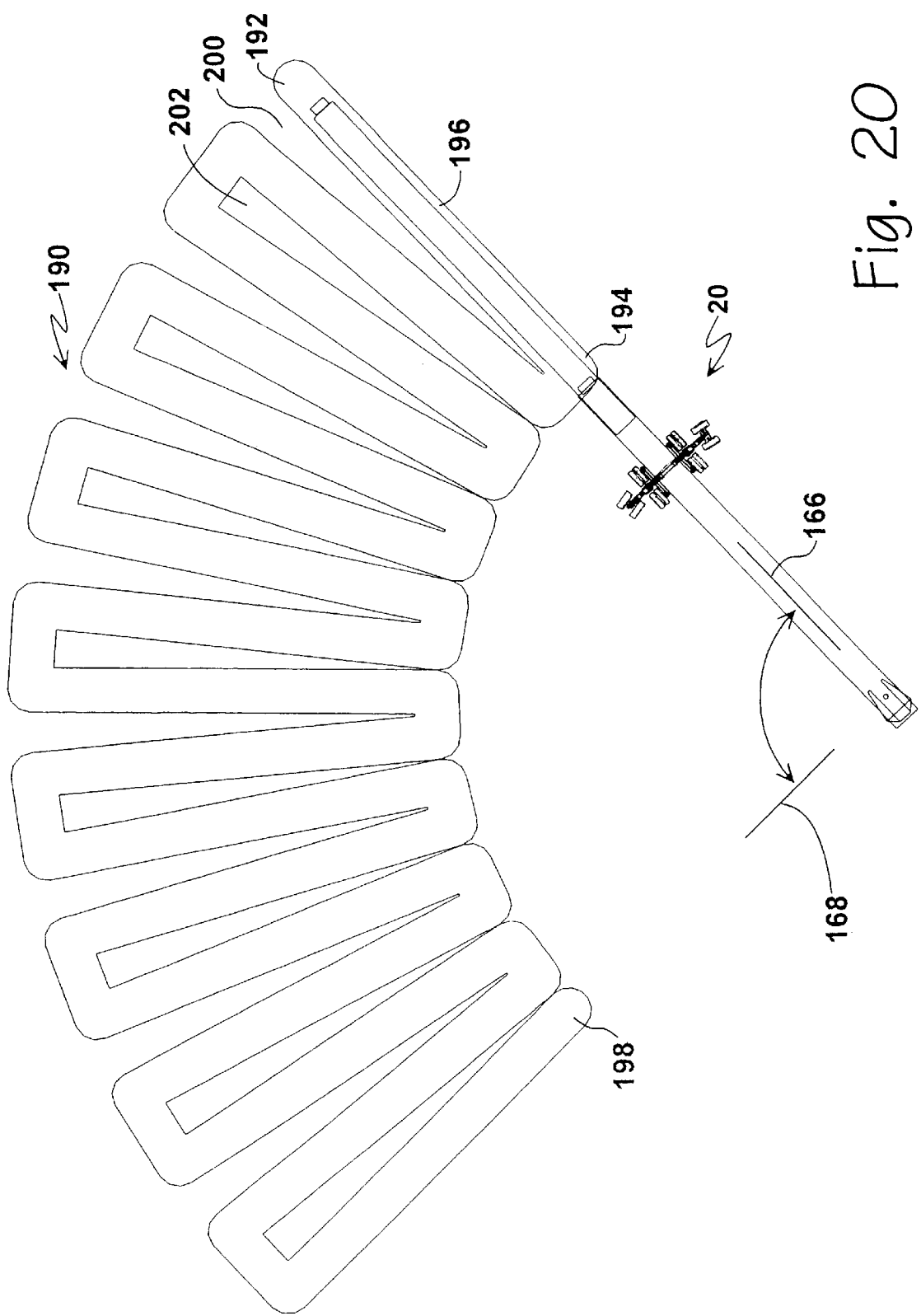
FIG. 20 is a plan view of the telescoping radial stacker and the base of an alternative radial row embodiment of the stockpile formed by the telescoping radial stacker of FIG. 1.

FIG. 20 is a plan view of the telescoping radial stacker 20 and the base of an alternative radial row embodiment of the stockpile 190 formed by the telescoping radial stacker of FIG. 1. The radial row stockpile 190 is another type of stack that can be created with the telescoping radial stacker 20 and controller 30 PLC. It may be particularly useful when it is necessary to store a variety of different types of material in a relatively small area. The desirability of the radial row stockpile arises from the fact that it is ordinarily preferred to remove stockpiled material by advancing the bucket of a loader into the stockpile in the same direction in which the rows of material are oriented. Doing so makes it highly likely that each bucket of material loaded out from the stockpile will include material from more than one row and thereby improves the likelihood that each load of material will be representative of the stored material. It should also be noted that the stockpiles formed by radial stacking conveyors are commonly referred to as radial stockpiles. In order to distinguish a stockpile formed with rows that are spoke-like (windrows) from a stockpile formed with rows that are portions of circles, I have denominated a stockpile having rows radiating from the pivot point as radial stockpiles and stockpiles having concentric rows as arcuate stockpiles.

The outer end of first base radial row 192 could be the starting point for such a stack and the first row of material could be formed by slowly retracting the stinger 48 as material is deposited until the inner end of first base radial row 194 is reached. The resulting stack will have a straight side of first base radial row 196. The stacker could be pivoted a few degrees and the stinger extended slowly while material is deposited, and so on until reaching the end of last base radial row 198. The placement of the second layer last radial row 200 is advantageously made between the peaks of the first two base radial rows. Likewise, the adjacent second layer intermediate radial row 202 will overlie the valley between adjacent rows of the preceding layer. The distance to which the stinger is retracted must be controlled as the outboard end of the conveyor is raised in order to prevent the stockpiled material from covering the radial travel wheels 28.

With each additional stockpile layer, the angle between the first terminus of arcuate travel 166 and the second terminus of arcuate travel 168 may optionally be decreased to prevent overrun at the ends of the pile. Ends of the stockpiles 160 170 so formed, when viewed from pivot 38 will be stepped in similarly to the sectional view of FIG. 18.

The significance of size segregation in material stockpiles is a function of many factors. If, for example the starting material is uniform, little concern is warranted. Likewise, if the application for the materials is non-specific. Where the proportions of materials falling in each of multiple size classifications is specified for materials delivered from the stockpile, it can be very important to prevent materials handling machinery and methods from degrading conforming materials. In the asphalt paving industry, for example, it is known that the quality of any batch of asphalt manufactured for road surfacing will be adversely affected if the aggregate used is deficient small particles because the mix will have voids that could allow water to penetrate, freeze, expand, then break up the paving. On the other hand, a mix deficient in large particles may fail to support the expected loads.

Changes and modifications in the specifically described embodiments can be carried out without departing from the scope of the invention which is intended to be limited only by the scope of the appended claims.

LIST OF ELEMENTS AND CORRESPONDING REFERENCE NUMBERS SHOWN IN THE DRAWINGS

| Ref. No. | Name of Element | Ref. No. | Name of Element |
|---|---|---|---|
| 20 | portable telescoping radial stacking conveyor | 134 | tilt sensor mounting arm |
| 22 | undercarriage | 136 | tilt sensor signal wire |
| 24 | transport wheels | 138 | zero belt speed sensor |
| 26 | portable radial axle assembly | 140 | counterweight |
| 28 | radial travel wheels | 142 | stinger positioner (winch) |
| 29 | outrigger | 144 | winch base bracket |
| 30 | control module | 146 | winch hydraulic drive motor |
| 32 | hydraulic fluid reservoir | 148 | rope take-up drum |
| 33 | hydraulic pump | 150 | extension wire rope |
| 34 | trailing link | 152 | retraction wire rope |
| 36 | elevating struts | 154 | retraction rope anchor tab |
| 38 | pivot plate | 156 | drum rope securement |
| 40 | jack | 158 | "E-chain" flexible raceway for electric power wiring, electric signal wiring, and hydraulic power tubing. |
| 42 | brake lights and turn signals | | |
| 44 | infeed hopper | | |
| 46 | primary (main) conveyor | | |
| 48 | secondary conveyor (stinger) | 160 | bulk material stockpile |
| 50 | stinger truss lattice | 162 | inner arcuate base row |
| 52 | main belt | 163 | first intermediate arcuate base row |
| 54 | main belt drive roller | | |
| 56 | stinger belt | 164 | outer arcuate base row |
| 58 | stinger belt drive roller | 165 | second intermediate base row |
| 59 | stinger feed end roller | | |
| 60 | troughing roller set | 166 | first terminus of arcuate travel |
| 62 | return idler roller | | |
| 64 | truss roller walking beam | 168 | second terminus of arcuate travel |
| 65 | high performance flange roller | | |
| 66 | truss roller walking beam pivot | 170 | arcuate row stack that minimizes segregation of material by size |
| 68 | primary truss roller | | |
| 70 | secondary truss roller | 172 | arcuate second layer inner row |
| 72 | stinger bottom truss chord | | |
| 73 | truss roller flange | 173 | arcuate second layer first intermediate row |
| 74 | stinger bottom brace | | |
| 76 | stinger bottom cross member | 174 | arcuate second layer outer row |
| 78 | perpendicular member of stinger truss lattice | | |
| | | 175 | arcuate second layer second intermediate row |
| 80 | diagonal member of stinger truss lattice | | |
| | | 176 | arcuate third layer inner row |
| 82 | stinger top truss chord | | |
| 84 | stinger belt roller mount | 178 | arcuate top layer row |
| 86 | main conveyor bottom truss chord | 180 | arcuate row stack that partially minimizes segregation of material by size |
| 88 | main conveyor top truss chord | | |
| 90 | main conveyor truss lattice member | 182 | second arcuate layer overrun |
| 92 | main conveyor bottom truss chord offset | 184 | third arcuate layer overrun |
| | | 186 | arcuate row stack over-running top layer |
| 94 | main conveyor offset brace | | |
| 96 | main conveyor discharge end reinforcement | 190 | radial row stockpile |
| | | 192 | outer end of first base radial row |
| 98 | main conveyor bottom cross member | | |
| | | 194 | inner end of first base radial row |
| 120 | inboard truss roller bracket | | |
| 122 | outboard truss roller bracket | 196 | side of first base radial row |
| 124 | trailer light mounting bracket | 198 | end of last base radial row |
| | | 200 | placement of second layer last radial row |
| 126 | stinger belt drive motor | | |
| 128 | "V"- belt tightener | 202 | placement of second layer intermediate radial row |
| 130 | stinger belt scraper | | |
| 132 | tilt sensor | | |

What is claimed is:

1. A portable telescoping radial stacking belt conveyor for stockpiling bulk particulate material comprising:

a. an undercarriage comprised of;

i. an axle assembly comprised of;
　ii. an elongated frame,
　iii. at least one transport wheel at each end of the frame,
　iv. at least one radial travel wheel at each end of the frame,
　v. means for selectively bringing transport wheels and radial travel wheels into contact with the ground,
　vi. a link attachment point at each end of the frame,
　vii. attachment point at each end of the frame for attaching one end of an elongated elevating strut,
　viii. an elongated trailing link having a first end and a second end, the first end pivotably attached to the frame link attachment point, and the second end pivotably attached to, b. a primary conveyor portion having a rectangular cross-section that is open in the center comprising;

i. a top chord, a bottom chord, a first truss lattice side and a second truss lattice side,
　ii. bottom cross members that interconnect the first truss side and the second truss side,
　iii. a belt supported by
　iv. troughing roller set assemblies and idler roller set assemblies that interconnect the first and second truss lattice side top chords,
　v. bottom cross members that interconnect the first and second truss lattice bottom chords,
　vi. a hitch for hitching the conveyor to a tow vehicle,
　vii. an infeed hopper,
　viii. a belt drive motor assembly, c. a secondary conveyor surroundingly receivable by the primary conveyor comprised of;

i. a top chord, a bottom chord, a first truss lattice side and a second truss lattice side,
　ii. bottom cross members that interconnect the first truss side and the second truss side,
　iii. a belt supported by
　iv. troughing roller set assemblies and return idler roller set assemblies that interconnect the first and second truss lattice side top chords,
　v. bottom cross members that interconnect the first and second truss lattice bottom chords,
　vi. a belt drive motor assembly, d. a winch with a rope linking the primary conveyor and secondary conveyor to positively extend the secondary conveyor from the primary conveyor and to positively retract the secondary conveyor within the primary conveyor, e. a tandem roller walking beam primary truss roller assembly situated at each side of the primary conveyor and proximate the bottom of the discharge end of the primary conveyor, each of the primary truss roller assemblies being engageable with the bottom of the stinger bottom truss chord, f. a tandem roller walking beam secondary truss roller assembly situated at each side of the primary conveyor and spaced apart axially from each primary truss roller assembly, each secondary truss roller assembly being engageable with the top of the stinger bottom truss chord.

2. The portable telescoping radial stacking conveyor defined in claim 1 wherein the transport wheel at each end of the frame is comprised of dual tandem wheels.

3. The portable telescoping radial stacking conveyor defined in claim 1 further comprising a hydraulic system for elevating the main conveyor from the undercarriage.

4. The portable telescoping radial stacking conveyor defined in claim 2 wherein the transport wheel at each end of the frame is comprised of dual tandem wheels.

5. A portable telescoping radial stacking conveyor comprising:
   a. an elongated primary conveyor portion belt moving assembly having a tail section and a head section, the primary conveyor portion having tandem roller walking beam truss roller assemblies adapted for extendably and retractably supportably receiving
   b. an axilally extendible and retractable stinger portion having an axis parallel to the axis of the primary conveyor portion, the stinger portion being a rectangular truss further comprising
      i. a top chord, a bottom chord comprised of a pair of rectangular load bearing members that extend laterally outwardly from the vertical truss members at each lower corner of the rectangular stinger truss, a first truss lattice side and a second truss lattice side,
      ii. bottom cross members that interconnect the first truss side and the second truss side,
      iii. a belt supported by
      iv. troughing roller set assemblies and return idler roller set assemblies that interconnect the first and second truss lattice side top chords,
      v. bottom cross members that interconnect the first and second truss lattice bottom chords,
      vi. a belt moving assembly having a tail section and a head section vertically below the primary conveyor head section so as to receive the output of the primary conveyor portion,
   c. a radial pivot plate having a center pivot for pivotably supporting the tail section proximate to the ground;
   d. an anchor pivot for pivotably connecting the tail section to the center pivot;
   e. elevating struts interposed between the belt moving assembly and;
   f. a carriage further comprised of;
      i. an elongated member having two ends and oriented perpendicularly to the longitudinal axis of the elongated belt moving assembly;
      ii. at least two transport wheels linked in tandem configuration by a pivotable walking beam attached to each end of the elongated member;
      iii. a support attached to and extending vertically upward from the elongated member for supporting the primary conveyor portion belt moving assembly together with the stinger assembly extendably and retractably nested within the primary conveyor portion during transport and storage;
      iv. at least one attachment point proximal to each end of the elongated member to which the elevating strut is pivotably attached;
      v. at least one elongated outrigger having an inner end pivotably attached proximal to each end of the elongated member and an outer end;
      vi. means for selectively extending the outriggers distally from opposite sides of the longitudinal axis of the belt moving assembly generally horizontally along the axis of the elongated member;
      vii. at least one radial travel wheel rotatably attached to the outer end of each outrigger and selectively engageable with the ground by extending the outriggers, each radial travel wheel being oriented with its axis of rotation generally along the radius extending from the center pivot to the radial travel wheel;
      viii. means for transferring the weight of the belt moving assembly to the radial travel wheels;
      ix. at least one hydraulic cylinder operatively linked to each outrigger to retract the outriggers and lift the radial travel wheels from contact with the ground;
      x. an electrically powered hydraulic pump for operating the hydraulic cylinders, and,
      xi. a hitch for connecting the carriage and belt moving assembly to a transport vehicle.

6. The portable telescoping radial stacking conveyor defined in claim 4 wherein the truss rollers are flange rollers configured to form tandem roller walking beam roller assemblies.

7. The portable telescoping radial stacking conveyor defined in claim 6 wherein the axial spacing between the primary truss roller walking beam assemblies and the secondary truss roller walking beam assemblies is not greater than 4.0 m (13 feet).

8. The portable radial stacking conveyor of claim 7 which has a fully extended operating length of not less than 45.7 m (150 feet).

9. The portable radial stacking conveyor of claim 6 which has a towing length of 24.4 m (80 feet) or less.

* * * * *